(12) United States Patent
Mesaros

(10) Patent No.: US 8,590,785 B1
(45) Date of Patent: Nov. 26, 2013

(54) DISCOUNTS IN A MOBILE DEVICE

(75) Inventor: Gregory J. Mesaros, Westlake, OH (US)

(73) Assignee: eWinWin, Inc., Tampa, FL (US)

( * ) Notice: Subject to any disclaimer, the term of this patent is extended or adjusted under 35 U.S.C. 154(b) by 902 days.

(21) Appl. No.: 11/680,415

(22) Filed: Feb. 28, 2007

Related U.S. Application Data

(63) Continuation-in-part of application No. 10/867,625, filed on Jun. 15, 2004, now Pat. No. 7,364,086.

(51) Int. Cl.
*G06K 15/00* (2006.01)
*G06Q 30/00* (2012.01)

(52) U.S. Cl.
USPC .... 235/383; 705/14.1; 705/14.25; 705/14.49; 705/14.53; 705/14.58

(58) Field of Classification Search
USPC ............ 235/375, 378, 380, 381, 383, 492; 705/14, 14.1, 14.13, 26, 27, 14.25, 705/14.31, 14.49, 14.53, 14.58
See application file for complete search history.

(56) References Cited

U.S. PATENT DOCUMENTS

| | | |
|---|---|---|
| 4,789,928 A | 12/1988 | Fujisaki |
| 4,799,156 A | 1/1989 | Shavit et al. |
| 4,887,207 A | 12/1989 | Natarajan |
| 4,947,028 A | 8/1990 | Gorog |
| 4,992,940 A | 2/1991 | Dworkin |
| 5,053,956 A | 10/1991 | Donald et al. |
| 5,053,957 A | 10/1991 | Suzuki |
| 5,063,506 A | 11/1991 | Brockwell et al. |
| 5,402,336 A | 3/1995 | Spiegelhoff et al. |
| 5,414,838 A | 5/1995 | Kolton et al. |
| 5,444,630 A | 8/1995 | Dlugos |
| 5,564,115 A | 10/1996 | Clarkson |
| 5,592,375 A | 1/1997 | Salmon et al. |
| 5,615,109 A | 3/1997 | Eder |
| 5,623,660 A | 4/1997 | Josephson |
| 5,664,115 A | 9/1997 | Fraser |
| 5,689,652 A | 11/1997 | Lupien et al. |
| 5,710,887 A | 1/1998 | Chelliah et al. |
| 5,717,989 A | 2/1998 | Tozzoli et al. |

(Continued)

FOREIGN PATENT DOCUMENTS

| | | |
|---|---|---|
| EP | 2000/50970 A2 | 8/2000 |
| JP | 11-184910 | 7/1999 |

(Continued)

OTHER PUBLICATIONS

Accompany: How it Works: "Anatomy of a Buy-Cycle", Jun. 15, 1999, pp. 1-3.

(Continued)

*Primary Examiner* — Thien M Le
*Assistant Examiner* — April Taylor
(74) *Attorney, Agent, or Firm* — Lewis Roca Rothgerber LLP

(57) ABSTRACT

A buying group discount system includes a universal discount card to provide discounts, rewards and/or offers to consumers participating in a buying group. Consumer purchases are aggregated with transactions of the entire buying group. Rewards and discounts are released to the buying group when the aggregated purchases satisfied criteria specified in a reward policy established by sellers. Furthermore, mechanisms are provided to enable the universal discount card to be positioned to provide contextual flash offers or advertisements.

20 Claims, 16 Drawing Sheets

(56) References Cited

U.S. PATENT DOCUMENTS

| | | |
|---|---|---|
| 5,732,400 A | 3/1998 | Mandler et al. |
| 5,734,890 A | 3/1998 | Case et al. |
| 5,794,207 A | 8/1998 | Walker et al. |
| 5,797,127 A | 8/1998 | Walker et al. |
| 5,822,736 A | 10/1998 | Hartman et al. |
| 5,826,244 A | 10/1998 | Huberman |
| 5,835,896 A | 11/1998 | Fisher et al. |
| 5,837,071 A | 11/1998 | Andersson et al. |
| 5,842,178 A | 11/1998 | Giovannoli |
| 5,845,265 A | 12/1998 | Woolston |
| 5,850,442 A | 12/1998 | Muftic |
| 5,855,008 A | 12/1998 | Goldhaber et al. |
| 5,870,721 A | 2/1999 | Norris |
| 5,878,400 A | 3/1999 | Carter, III |
| 5,890,138 A | 3/1999 | Godin et al. |
| 5,897,620 A | 4/1999 | Walker et al. |
| 5,903,830 A | 5/1999 | Joao et al. |
| 5,923,741 A | 7/1999 | Wright et al. |
| 5,933,817 A | 8/1999 | Hucal |
| 5,940,807 A | 8/1999 | Purcell |
| 5,945,653 A | 8/1999 | Walker et al. |
| 5,950,172 A | 9/1999 | Klingman |
| 5,960,411 A | 9/1999 | Hartman et al. |
| 5,966,697 A | 10/1999 | Fergerson et al. |
| 5,970,478 A | 10/1999 | Walker et al. |
| 5,974,396 A | 10/1999 | Anderson et al. |
| 5,974,406 A | 10/1999 | Bisdikian et al. |
| 5,987,434 A | 11/1999 | Libman |
| 5,995,943 A | 11/1999 | Bull et al. |
| 5,999,915 A | 12/1999 | Nahan et al. |
| 6,014,638 A | 1/2000 | Burge et al. |
| 6,016,484 A | 1/2000 | Williams et al. |
| 6,026,383 A | 2/2000 | Ausubel |
| 6,032,136 A | 2/2000 | Brake et al. |
| 6,035,289 A | 3/2000 | Chou et al. |
| 6,052,670 A | 4/2000 | Johnson |
| 6,055,519 A | 4/2000 | Kennedy et al. |
| 6,055,573 A | 4/2000 | Gardenswartz et al. |
| 6,064,981 A | 5/2000 | Barni et al. |
| 6,078,906 A | 6/2000 | Huberman |
| 6,101,484 A | 8/2000 | Halbert et al. |
| 6,108,632 A | 8/2000 | Reeder et al. |
| 6,108,639 A | 8/2000 | Walker et al. |
| 6,112,185 A | 8/2000 | Walker et al. |
| 6,112,189 A | 8/2000 | Rickard et al. |
| 6,131,087 A | 10/2000 | Luke et al. |
| 6,141,653 A | 10/2000 | Conklin et al. |
| 6,151,588 A | 11/2000 | Tozzoli et al. |
| 6,154,738 A | 11/2000 | Call |
| 6,167,383 A | 12/2000 | Henson |
| 6,195,646 B1 | 2/2001 | Grosh et al. |
| 6,219,653 B1 | 4/2001 | O'Neill et al. |
| 6,233,566 B1 | 5/2001 | Levine et al. |
| 6,236,972 B1 | 5/2001 | Shkedy |
| 6,236,977 B1 | 5/2001 | Verba et al. |
| 6,236,978 B1 | 5/2001 | Tuzhilin |
| 6,249,772 B1 | 6/2001 | Walker et al. |
| 6,253,189 B1 | 6/2001 | Feezell et al. |
| 6,260,019 B1 | 7/2001 | Courts |
| 6,260,024 B1 | 7/2001 | Shkedy |
| 6,266,651 B1 | 7/2001 | Woolston |
| 6,269,343 B1 | 7/2001 | Pallakoff |
| 6,289,348 B1 | 9/2001 | Richard et al. |
| 6,323,894 B1 | 11/2001 | Katz |
| 6,327,574 B1 | 12/2001 | Kramer et al. |
| 6,332,127 B1 | 12/2001 | Bandera et al. |
| 6,332,135 B1 | 12/2001 | Conklin et al. |
| 6,336,105 B1 | 1/2002 | Conklin et al. |
| 6,338,050 B1 | 1/2002 | Conklin et al. |
| 6,360,205 B1 | 3/2002 | Iyengar et al. |
| 6,397,208 B1 | 5/2002 | Lee |
| 6,415,270 B1 | 7/2002 | Rackson et al. |
| 6,418,415 B1 | 7/2002 | Walker et al. |
| 6,418,441 B1 | 7/2002 | Call |
| 6,449,601 B1 | 9/2002 | Friedland et al. |
| 6,450,407 B1 * | 9/2002 | Freeman et al. ............... 235/492 |
| 6,456,986 B1 | 9/2002 | Boardman et al. |
| 6,466,919 B1 | 10/2002 | Walker et al. |
| 6,496,568 B1 | 12/2002 | Nelson |
| 6,505,046 B1 | 1/2003 | Baker |
| 6,507,279 B2 | 1/2003 | Loof |
| 6,510,434 B1 | 1/2003 | Anderson et al. |
| 6,519,571 B1 | 2/2003 | Guheen et al. |
| 6,535,856 B1 | 3/2003 | Tal |
| 6,553,346 B1 | 4/2003 | Walker et al. |
| 6,553,350 B2 | 4/2003 | Carter |
| 6,560,501 B1 | 5/2003 | Walser et al. |
| 6,578,014 B1 | 6/2003 | Murcko, Jr. |
| 6,584,451 B1 | 6/2003 | Shoham et al. |
| 6,587,835 B1 | 7/2003 | Treyz et al. |
| 6,598,026 B1 | 7/2003 | Ojha et al. |
| 6,601,043 B1 | 7/2003 | Purcell |
| 6,604,089 B1 | 8/2003 | Van Horn et al. |
| 6,606,603 B1 | 8/2003 | Joseph et al. |
| 6,606,607 B1 | 8/2003 | Martin et al. |
| 6,607,136 B1 | 8/2003 | Atsmon et al. |
| 6,631,356 B1 | 10/2003 | Van Horn et al. |
| 6,647,257 B2 | 11/2003 | Owensby |
| 6,647,373 B1 | 11/2003 | Carlton-Foss |
| 6,658,093 B1 | 12/2003 | Langseth et al. |
| 6,662,194 B1 | 12/2003 | Joao et al. |
| 6,705,520 B1 | 3/2004 | Pitroda et al. |
| 6,716,101 B1 | 4/2004 | Meadows et al. |
| 6,754,636 B1 | 6/2004 | Walker et al. |
| 6,769,607 B1 | 8/2004 | Pitroda et al. |
| 6,778,968 B1 | 8/2004 | Gulati |
| 6,782,370 B1 | 8/2004 | Stack |
| 6,785,661 B1 | 8/2004 | Mandler et al. |
| 6,847,938 B1 | 1/2005 | Moore |
| 6,847,965 B2 | 1/2005 | Walker et al. |
| 6,850,907 B2 | 2/2005 | Lutnick et al. |
| 6,868,392 B1 | 3/2005 | Ogasawara |
| 6,871,140 B1 | 3/2005 | Florance et al. |
| 6,871,190 B1 | 3/2005 | Seymour et al. |
| 6,876,974 B1 | 4/2005 | Marsh et al. |
| 6,876,977 B1 | 4/2005 | Marks |
| 6,876,982 B1 | 4/2005 | Lancaster |
| 6,876,983 B1 | 4/2005 | Goddard |
| 6,877,655 B1 | 4/2005 | Robertson et al. |
| 6,877,665 B2 | 4/2005 | Challa et al. |
| 6,915,275 B2 | 7/2005 | Banerjee et al. |
| 6,925,446 B2 | 8/2005 | Watanabe |
| 6,928,416 B1 | 8/2005 | Bertash |
| 6,934,690 B1 | 8/2005 | Van Horn et al. |
| 6,954,734 B1 | 10/2005 | Kuelbs et al. |
| 6,985,879 B2 | 1/2006 | Walker et al. |
| 6,990,467 B1 | 1/2006 | Kwan |
| 6,992,794 B2 | 1/2006 | Keane et al. |
| 7,013,286 B1 | 3/2006 | Aggarwal et al. |
| 7,039,603 B2 | 5/2006 | Walker et al. |
| 7,047,206 B1 | 5/2006 | Schultze |
| 7,062,452 B1 | 6/2006 | Lotvin et al. |
| 7,065,494 B1 | 6/2006 | Evans |
| 7,069,228 B1 | 6/2006 | Rose et al. |
| 7,072,849 B1 | 7/2006 | Filepp et al. |
| 7,072,853 B2 | 7/2006 | Shkedi |
| 7,076,447 B1 | 7/2006 | Peyser et al. |
| 7,080,030 B2 | 7/2006 | Eglen et al. |
| 7,082,408 B1 | 7/2006 | Baumann et al. |
| 7,103,565 B1 | 9/2006 | Vaid |
| 7,107,225 B1 | 9/2006 | McClung, III |
| 7,107,226 B1 | 9/2006 | Cassidy et al. |
| 7,120,592 B1 | 10/2006 | Lewis |
| 7,124,099 B2 | 10/2006 | Mesaros |
| 7,124,107 B1 | 10/2006 | Pishevar et al. |
| 7,133,835 B1 | 11/2006 | Fusz et al. |
| 7,143,057 B2 | 11/2006 | Kuelbs et al. |
| 7,146,330 B1 | 12/2006 | Alon et al. |
| 7,165,045 B1 | 1/2007 | Kim-E |
| 7,181,419 B1 | 2/2007 | Mesaros |
| 7,194,427 B1 | 3/2007 | Van Horn et al. |
| 7,194,442 B1 | 3/2007 | Flanagan et al. |
| 7,213,754 B2 | 5/2007 | Eglen et al. |
| 7,240,021 B1 | 7/2007 | Walker et al. |

(56) References Cited

U.S. PATENT DOCUMENTS

| | | |
|---|---|---|
| 7,243,082 B1 | 7/2007 | Forlai |
| 7,254,833 B1 | 8/2007 | Cornelius et al. |
| 7,263,498 B1 | 8/2007 | Van Horn et al. |
| 7,263,505 B1 | 8/2007 | Forlai |
| 7,296,001 B1 | 11/2007 | Ephrati et al. |
| 7,330,826 B1 | 2/2008 | Porat et al. |
| 7,343,317 B2* | 3/2008 | Jokinen et al. ............ 705/14.64 |
| 7,349,890 B1 | 3/2008 | Pathak et al. |
| 7,363,246 B1 | 4/2008 | Van Horn et al. |
| 7,364,086 B2 | 4/2008 | Mesaros |
| 7,376,613 B1 | 5/2008 | Cofino et al. |
| 7,379,899 B1 | 5/2008 | Junger |
| 7,415,428 B2 | 8/2008 | Garwood |
| 7,415,617 B2 | 8/2008 | Ginter et al. |
| 7,433,832 B1 | 10/2008 | Bezos et al. |
| 7,464,051 B1 | 12/2008 | Heggem |
| 7,467,103 B1 | 12/2008 | Murray et al. |
| 7,475,024 B1 | 1/2009 | Phan |
| 7,480,627 B1 | 1/2009 | Van Horn et al. |
| 7,496,543 B1 | 2/2009 | Bamford et al. |
| 7,516,089 B1 | 4/2009 | Walker et al. |
| 7,523,045 B1 | 4/2009 | Walker et al. |
| 7,539,742 B2 | 5/2009 | Spector |
| 7,542,927 B2 | 6/2009 | Mukai |
| 7,552,069 B2 | 6/2009 | Kepecs |
| 7,577,582 B1 | 8/2009 | Ojha et al. |
| 7,584,146 B1 | 9/2009 | Duhon |
| 7,593,871 B1 | 9/2009 | Mesaros |
| 7,596,509 B1 | 9/2009 | Bryson |
| 7,599,857 B2 | 10/2009 | Bishop et al. |
| 7,606,731 B2 | 10/2009 | McClung, III |
| 7,624,044 B2 | 11/2009 | Wren |
| 7,630,919 B1 | 12/2009 | Obrecht |
| 7,636,672 B2 | 12/2009 | Angles et al. |
| 7,672,870 B2* | 3/2010 | Haines et al. ................ 705/14.1 |
| 7,680,696 B1 | 3/2010 | Murray |
| 7,689,463 B1 | 3/2010 | Mesaros |
| 7,689,468 B2 | 3/2010 | Walker et al. |
| 7,689,469 B1 | 3/2010 | Mesaros |
| 7,693,748 B1 | 4/2010 | Mesaros |
| 7,698,173 B1 | 4/2010 | Burge et al. |
| 7,698,208 B2 | 4/2010 | Hirani et al. |
| 7,698,240 B1 | 4/2010 | Chatterjee et al. |
| 7,706,838 B2 | 4/2010 | Atsmon et al. |
| 7,725,350 B2 | 5/2010 | Schlee |
| 7,729,977 B2 | 6/2010 | Xiao et al. |
| 7,747,473 B1 | 6/2010 | Mesaros |
| 7,792,699 B2 | 9/2010 | Kwei |
| 7,801,803 B2 | 9/2010 | Forlai |
| 7,813,955 B2* | 10/2010 | Ariff et al. ................. 705/14.28 |
| 7,814,106 B2 | 10/2010 | Guido et al. |
| 7,814,114 B2 | 10/2010 | Mi et al. |
| 7,815,114 B2 | 10/2010 | Mesaros |
| 7,818,212 B1 | 10/2010 | Mesaros |
| 7,860,776 B1 | 12/2010 | Chin et al. |
| 7,890,373 B2 | 2/2011 | Junger |
| 7,899,707 B1 | 3/2011 | Mesaros |
| 7,912,761 B2* | 3/2011 | Vaid ............................. 705/26.2 |
| 7,917,386 B2 | 3/2011 | Christensen |
| 7,917,416 B2 | 3/2011 | Quinn et al. |
| 7,937,288 B2 | 5/2011 | Blaser et al. |
| 7,942,316 B2 | 5/2011 | Bennett et al. |
| 7,953,730 B1 | 5/2011 | Bleckner et al. |
| 7,958,007 B1 | 6/2011 | Urbanski et al. |
| 8,005,747 B2* | 8/2011 | Forlai ............................. 705/37 |
| 8,015,583 B2 | 9/2011 | Bates et al. |
| 8,024,226 B2 | 9/2011 | Fusz et al. |
| 8,032,409 B1 | 10/2011 | Mikurak |
| 8,032,422 B2 | 10/2011 | Pickard et al. |
| 8,036,941 B2 | 10/2011 | Bennett et al. |
| 8,073,762 B2 | 12/2011 | Sheth et al. |
| 8,140,402 B1 | 3/2012 | Mesaros |
| 8,140,405 B2 | 3/2012 | Mesaros |
| 8,140,442 B2 | 3/2012 | Heyer |
| 8,140,615 B2 | 3/2012 | Miller et al. |
| 8,150,735 B2 | 4/2012 | Walker et al. |
| 8,160,931 B2 | 4/2012 | Mesaros |
| 8,196,811 B2 | 6/2012 | Mesaros |
| 8,219,460 B1 | 7/2012 | Mesaros |
| 8,249,942 B2 | 8/2012 | Mesaros |
| 8,271,327 B2 | 9/2012 | Walker et al. |
| 8,271,332 B2 | 9/2012 | Mesaros |
| 8,285,598 B2 | 10/2012 | Mesaros |
| 8,285,600 B2 | 10/2012 | Mesaros |
| 8,306,870 B2 | 11/2012 | Mesaros |
| 8,311,896 B2 | 11/2012 | Mesaros |
| 8,341,035 B2 | 12/2012 | Mesaros |
| 8,401,918 B2 | 3/2013 | Mesaros |
| 8,438,075 B2 | 5/2013 | Mesaros |
| 8,473,353 B2 | 6/2013 | Matsuda et al. |
| 8,489,466 B1 | 7/2013 | Van Horn et al. |
| 8,494,914 B2 | 7/2013 | Mesaros |
| 8,494,915 B2 | 7/2013 | Mesaros |
| 8,533,002 B2 | 9/2013 | Mesaros |
| 8,567,672 | 10/2013 | Mesaros |
| 2001/0011264 A1 | 8/2001 | Kawasaki |
| 2001/0014868 A1* | 8/2001 | Herz et al. ....................... 705/14 |
| 2001/0018660 A1 | 8/2001 | Sehr |
| 2001/0039514 A1 | 11/2001 | Barenbaum et al. |
| 2001/0044751 A1 | 11/2001 | Pugliese, III et al. |
| 2001/0047296 A1 | 11/2001 | Wyker |
| 2001/0047311 A1 | 11/2001 | Singh |
| 2002/0004765 A1 | 1/2002 | Han et al. |
| 2002/0007324 A1 | 1/2002 | Centner et al. |
| 2002/0026351 A1 | 2/2002 | Coleman |
| 2002/0032573 A1 | 3/2002 | Williams et al. |
| 2002/0035536 A1 | 3/2002 | Gellman |
| 2002/0040352 A1 | 4/2002 | McCormick |
| 2002/0046105 A1 | 4/2002 | Gardenswartz et al. |
| 2002/0046147 A1 | 4/2002 | Livesay et al. |
| 2002/0052782 A1 | 5/2002 | Landesmann |
| 2002/0065762 A1 | 5/2002 | Lee et al. |
| 2002/0065769 A1 | 5/2002 | Irribarren et al. |
| 2002/0069079 A1 | 6/2002 | Vega |
| 2002/0080950 A1 | 6/2002 | Koko et al. |
| 2002/0082881 A1 | 6/2002 | Price et al. |
| 2002/0091580 A1 | 7/2002 | Wang |
| 2002/0099643 A1 | 7/2002 | Abeshouse et al. |
| 2002/0103741 A1 | 8/2002 | Boies et al. |
| 2002/0107773 A1* | 8/2002 | Abdou ............................ 705/37 |
| 2002/0116282 A1 | 8/2002 | Martin et al. |
| 2002/0143692 A1 | 10/2002 | Heimermann et al. |
| 2002/0147670 A1 | 10/2002 | Lange |
| 2002/0165771 A1 | 11/2002 | Walker et al. |
| 2002/0165821 A1 | 11/2002 | Tree |
| 2002/0169703 A1 | 11/2002 | Lutnick et al. |
| 2002/0169759 A1 | 11/2002 | Kraft et al. |
| 2002/0174051 A1 | 11/2002 | Wise |
| 2002/0188508 A1 | 12/2002 | Lee et al. |
| 2003/0004802 A1 | 1/2003 | Callegari |
| 2003/0004808 A1* | 1/2003 | Elhaoussine et al. ........... 705/14 |
| 2003/0004823 A1 | 1/2003 | Sagy |
| 2003/0028473 A1 | 2/2003 | Eso et al. |
| 2003/0041002 A1 | 2/2003 | Hao et al. |
| 2003/0055774 A1 | 3/2003 | Ginsberg |
| 2003/0088494 A1 | 5/2003 | Lee |
| 2003/0093355 A1 | 5/2003 | Issa |
| 2003/0109949 A1 | 6/2003 | Ikeda |
| 2003/0111531 A1 | 6/2003 | Williams et al. |
| 2003/0115100 A1 | 6/2003 | Teicher |
| 2003/0126040 A1 | 7/2003 | Mesaros |
| 2003/0126152 A1 | 7/2003 | Jhanji |
| 2003/0149619 A1 | 8/2003 | Stanley et al. |
| 2003/0167222 A1 | 9/2003 | Mehrotra et al. |
| 2003/0195832 A1 | 10/2003 | Cao et al. |
| 2003/0200150 A1 | 10/2003 | Westcott et al. |
| 2003/0208412 A1 | 11/2003 | Hillestad et al. |
| 2003/0216960 A1* | 11/2003 | Postrel ............................ 705/14 |
| 2003/0233276 A1 | 12/2003 | Pearlman et al. |
| 2003/0233557 A1 | 12/2003 | Zimmerman |
| 2004/0015415 A1 | 1/2004 | Cofino et al. |
| 2004/0019646 A1 | 1/2004 | Zweben et al. |
| 2004/0039661 A1* | 2/2004 | Fuzell-Casey et al. ......... 705/27 |
| 2004/0039677 A1 | 2/2004 | Mura et al. |

(56) References Cited

U.S. PATENT DOCUMENTS

| | | |
|---|---|---|
| 2004/0093276 A1 | 5/2004 | Nishio |
| 2004/0128197 A1* | 7/2004 | Bam et al. .................. 705/14 |
| 2004/0215467 A1 | 10/2004 | Coffman et al. |
| 2004/0215500 A1 | 10/2004 | Monahan |
| 2005/0021400 A1* | 1/2005 | Postrel ..................... 705/14 |
| 2005/0021401 A1* | 1/2005 | Postrel ..................... 705/14 |
| 2005/0038713 A1 | 2/2005 | Pickard et al. |
| 2005/0149458 A1 | 7/2005 | Eglen et al. |
| 2005/0171918 A1 | 8/2005 | Eden et al. |
| 2005/0197857 A1 | 9/2005 | Avery |
| 2005/0216337 A1 | 9/2005 | Roberts et al. |
| 2005/0272442 A1 | 12/2005 | Miller et al. |
| 2005/0273415 A1 | 12/2005 | Mathews et al. |
| 2006/0036491 A1 | 2/2006 | Leung et al. |
| 2006/0059062 A1 | 3/2006 | Wood et al. |
| 2006/0069619 A1 | 3/2006 | Walker et al. |
| 2006/0095327 A1 | 5/2006 | Vaughn et al. |
| 2006/0095366 A1 | 5/2006 | Sheth et al. |
| 2006/0106678 A1 | 5/2006 | Walker et al. |
| 2006/0129454 A1 | 6/2006 | Moon et al. |
| 2006/0143080 A1 | 6/2006 | Garg et al. |
| 2006/0178918 A1 | 8/2006 | Mikurak |
| 2006/0259421 A1 | 11/2006 | Maass |
| 2007/0150349 A1 | 6/2007 | Handel et al. |
| 2007/0206584 A1 | 9/2007 | Fulling et al. |
| 2007/0220169 A1 | 9/2007 | Silver et al. |
| 2008/0015711 A1 | 1/2008 | Charland et al. |
| 2008/0052189 A1 | 2/2008 | Walker et al. |
| 2008/0052750 A1 | 2/2008 | Grunnet-Jepsen et al. |
| 2008/0071634 A1 | 3/2008 | Rampell et al. |
| 2008/0082418 A1 | 4/2008 | Fordyce et al. |
| 2008/0126201 A1 | 5/2008 | Ullah |
| 2008/0147534 A1* | 6/2008 | Ephrati et al. .................. 705/37 |
| 2008/0249846 A1 | 10/2008 | Yonemoto et al. |
| 2008/0255886 A1 | 10/2008 | Unkefer et al. |
| 2009/0055328 A1 | 2/2009 | Bamford et al. |
| 2009/0059856 A1 | 3/2009 | Kermoal et al. |
| 2009/0083136 A1 | 3/2009 | Blackwood |
| 2009/0089177 A1 | 4/2009 | Dayton et al. |
| 2009/0150218 A1 | 6/2009 | Brunner et al. |
| 2009/0187455 A1 | 7/2009 | Fernandes et al. |
| 2009/0198622 A1 | 8/2009 | Temte et al. |
| 2009/0276305 A1 | 11/2009 | Clopp |
| 2009/0307073 A1 | 12/2009 | MirrokniBanadaki et al. |
| 2009/0319359 A1 | 12/2009 | Soza et al. |
| 2009/0327034 A1 | 12/2009 | Peterson |
| 2009/0327038 A1 | 12/2009 | Peterson |
| 2009/0327101 A1 | 12/2009 | Sayed |
| 2009/0327140 A1 | 12/2009 | Kuo |
| 2010/0088174 A1* | 4/2010 | Cohagan et al. .......... 705/14.33 |
| 2010/0125525 A1 | 5/2010 | Inamdar |
| 2010/0169161 A1 | 7/2010 | Sacco |
| 2011/0004515 A1 | 1/2011 | Mesaros |
| 2011/0016010 A1 | 1/2011 | Mesaros |
| 2011/0040624 A1 | 2/2011 | Jhanji |
| 2011/0125592 A1 | 5/2011 | Mesaros |
| 2011/0213648 A1 | 9/2011 | Mesaros |
| 2011/0213649 A1 | 9/2011 | Mesaros |
| 2011/0213650 A1 | 9/2011 | Mesaros |
| 2011/0213653 A1 | 9/2011 | Mesaros |
| 2011/0238476 A1 | 9/2011 | Carr et al. |
| 2011/0246271 A1 | 10/2011 | Mesaros |
| 2011/0246274 A1 | 10/2011 | Mesaros |
| 2011/0264499 A1* | 10/2011 | Abendroth et al. ........ 705/14.23 |
| 2011/0270699 A1 | 11/2011 | Mesaros |
| 2011/0270700 A1 | 11/2011 | Mesaros |
| 2012/0022970 A1 | 1/2012 | Mesaros |
| 2012/0029993 A1 | 2/2012 | Mesaros |
| 2012/0029995 A1 | 2/2012 | Mesaros |
| 2012/0035999 A1 | 2/2012 | Mesaros |
| 2012/0036000 A1 | 2/2012 | Mesaros |
| 2012/0036031 A1 | 2/2012 | Mesaros |
| 2012/0041811 A1 | 2/2012 | Mesaros |
| 2012/0054012 A1 | 3/2012 | Mesaros |
| 2012/0158475 A1 | 6/2012 | Mesaros |
| 2012/0158479 A1 | 6/2012 | Raisch |
| 2012/0179526 A1 | 7/2012 | Mesaros |
| 2012/0179530 A1 | 7/2012 | Mesaros |
| 2012/0197705 A1 | 8/2012 | Mesaros |
| 2012/0197722 A1 | 8/2012 | Mesaros |
| 2012/0203603 A1 | 8/2012 | Mesaros |
| 2012/0203611 A1 | 8/2012 | Mesaros |
| 2012/0203615 A1 | 8/2012 | Mesaros |
| 2012/0209683 A1 | 8/2012 | Mesaros |
| 2012/0209737 A1 | 8/2012 | Mesaros |
| 2012/0209738 A1 | 8/2012 | Mesaros |
| 2012/0209739 A1 | 8/2012 | Mesaros |
| 2012/0209740 A1 | 8/2012 | Mesaros |
| 2012/0209743 A1 | 8/2012 | Mesaros |
| 2012/0226541 A1 | 9/2012 | Mesaros |
| 2012/0245993 A1 | 9/2012 | Mesaros |
| 2012/0253912 A1 | 10/2012 | Mesaros |
| 2012/0253977 A1 | 10/2012 | Mesaros |
| 2012/0265590 A1 | 10/2012 | Mesaros |
| 2012/0265600 A1 | 10/2012 | Mesaros |
| 2012/0278157 A1 | 11/2012 | Mesaros |
| 2012/0284110 A1 | 11/2012 | Mesaros |
| 2012/0290395 A1 | 11/2012 | Mesaros |
| 2012/0310738 A1 | 12/2012 | Mesaros |
| 2013/0006741 A1 | 1/2013 | Mesaros |
| 2013/0013385 A1 | 1/2013 | Mesaros |
| 2013/0013388 A1 | 1/2013 | Mesaros |
| 2013/0080282 A1 | 3/2013 | Mesaros |
| 2013/0117086 A1 | 5/2013 | Mesaros |
| 2013/0246122 A1 | 9/2013 | Mesaros |
| 2013/0246223 A1 | 9/2013 | Mesaros |

FOREIGN PATENT DOCUMENTS

| | | |
|---|---|---|
| WO | WO 9821713 A2 | 5/1998 |
| WO | 00/70424 A2 | 11/2000 |
| WO | WO 2008/083371 | 7/2008 |

OTHER PUBLICATIONS

Amazon.com, "Help/Shipping", Archived on Feb. 2, 2003 by www.archive.org. Last accessed Mar. 19, 2008, 9 pages.

Ashton Technology Group, Inc. Announces NASDAQ National Market System Listing; Enters into Clearing Arrangements with 8 National Brokerage Firms, Business Wire, Jan. 3, 2000. http://www.findarticles.com/p/articles/mi_m0EIN/is_2000_Jan_3/ai_58429780/print. Last accessed Apr. 8, 2009, 3 pages.

Blyth, et al. Merchandising System Collecting Data. Derwent Information Ltd. Last accessed Jan. 20, 2009, 2 pages.

Breyer. "Bargains in Cyberspace," National Home Center News, vol. 26, No. 21, p. 21, Nov. 20, 2000.

Business Editors. "Weatherchem Announces Major eCommerce Success with eWinWin", Aug. 9, 2001, Business Wire, (p. 1) 2 pages.

Business Editors and High Tech Writers, "eWinWin Announces the Release of DAS 3.0, the Next Generation of B2B Demand Aggregation Solutions" Dec. 28, 2000, Businee wire, p. 1 (4 pages).

Cbot, "Trading in Futures Can Provide Considerable Financial Rewards", Last accessed Mar. 19, 2008, 41 pages.

Chicago Board of Trade, "Knowledge Center," as archived by Archive.org, on Feb. 13, 2003.

Computer Geeks Discount Outlet, "Order Status," Mar. 1, 2002.

Deierlein. "Smart Fuel Buying," Fleet Equipment, vol. 24, No. 8, pp. 42-44, Aug. 1998.

Edwards. "Increase Your Bottom Line : Automated Customer Service and Marketing," E-Business Advisor, vol. 17, No. 7, p. 30, Jul. 1999.

Enos. Vying to be the Top Dog. Upside vol. 12, No. 3, pp. 160-165, Mar. 2000.

eWinWin, "eCommerce Redefined : The Positive Impact of eWinWin's Demand Aggregation System on the Manufacturing Supply Chain", Oct. 2000. Last accessed Mar. 19, 2008, 11 pages.

"Excite@Home Standardizes on Siebel eBusiness; Leading Broadband Media Company Relies on Siebel Systems to Manage Customer Relationships Across its Entire Family of Services," Business Wire, Jan. 19, 2000.

Gaonkar, et al. Strategic Sourcing and Collaborative Planning in Internet Enabled Supply Chain Networks Producing Multigeneration

(56) References Cited

OTHER PUBLICATIONS

Products. IEEE Transactions on Automation Science and Engineering, vol. 2, issue 1, Jan. 2005, pp. 54-66.
"Global Real Estate Markets Spell Opportunity, Experts Tell Realtors," PR Newswire, Nov. 21, 1991.
Gurley. Creating a Great E-Commerce Business. Fortune, Mar. 16, 1998.
Yeh, et al. "Optimal Production Run Length for Products Sold with Warranty," (Abstract only), European Journal of Operational Research, vol. 120, No. 3, pp. 575-582, Feb. 1, 2000.
Meridex Introduces Advanced Features to its B2B Network, PR Newswire, May 25, 2000. http://www.canadait.com/cfm/index.cfm?It=106&Id=3421&Se=355&Sv=Company&Lo=441. Last accessed Apr. 30, 2009, 3 pages.
MobShop Launches New Rev of Selling App, Online Reporter, May 28, 2001. http://findarticles.com/p/articles/mi_hb5932/is_200105/ai_n23884526/. Last accessed Apr. 30, 2009, 2 pages.
International Search Report for PCT Application No. PCT/US07/89195, mailed May 12, 2008, 8 pages.
Koenig, et al. Quantitative Industrial Ecology. IEEE Transactions on Systems, Man and Cybernetics, Part C, Issue 1, Feb. 1998, pp. 16-28.
Lamparter. "Natural Selection." American Printer, vol. 217, No. 3, pp. 54-64, Jun. 1996.
"Lucent Launches On-Line Catalog" M2 Presswire, Jan. 22, 1999.
Magna Cash Cybersource Partner to Expand Online Payment Options. PR Newswire, New York, Jan. 15.
Maxwell, Pricing education in the United States of America: responding to the needs of business, The Journal of Product & Brand Management, Santa Barbara, Aug. 1998, vol. 7, Issue 4, p. 336-341.
Mesaros. Innovation in Difficult Times : How US Manufacturers are Using Demand Aggregation to Increase Sales and Lower Costs. Jul. 26, 2001. Last accessed Mar. 19, 2008, 4 pages.
Meriam Webster's Collegiate Dictionary, Tenth Edition, 1997, p. 732.
Moody. From E-Commerce to We-Commerce. Computer Weekly, 42, Jun. 3, 1999. Last accessed Apr. 9, 2009, 2 pages.
Myers. "E-Solutions for Surplus Inventory," Dsn Retailing Today, vol. 39, No. 21, p. 13, Nov. 6, 2000.
Nellore, et al. Factors Influencing Success in Integrated Product Development (IPD) Projects. IEEE Transactions on Engineering Management, vol. 48, issue 2, May 2001, pp. 164-174.
OA Dated Oct. 20, 2008 for U.S. Appl. No. 10/464,585, 11 pages.
OA Dated Oct. 27, 2008 for U.S. Appl. No. 11/464,376, 13 pages.
OA Dated Nov. 3, 2008 for U.S. Appl. No. 11/150,920, 161 pages.
OA Dated Oct. 29, 2008 for U.S. Appl. No. 11/152,462, 27 pages.
OA Dated Apr. 6, 2009 for U.S. Appl. No. 11/680,431, 33 pages.
OA Dated Mar. 25, 2009 for U.S. Appl. No. 11/556,604, 59 pages.
OA Dated Apr. 10, 2009 for U.S. Appl. No. 10/351,069, 27 pages.
Rahim, et al. Optimal Decision Rules for Determining the Length of Production Run, (Abstract Only), Computers and Industrial Engineering, vol. 9, No. 2, pp. 195-202, 1985.
Rahim, et al. "Optimal Production Run for a Process Having Multilevel Tool Wear," (Abstract only), International Journal of Systems Science, vol. 19, No. 1, pp. 139-149, 1988.
Rahim, et al. "Optimal Production Run for a Process with Random Linear Drift," (Abstract only), Omega, vol. 16, No. 4, pp. 347-351, 1988.
"Screen Savers," Lawyer, Feb. 19, 2001.
Sivakumar, et al. Price Match Guarantees: Rationale, Implementation, and Consumer Response. Pricing Strategy and Practice, Bradford, 1996, vol. 4, issue 4, 11 pgs. Recovered from ProQuest Database Aug. 25, 2006.
Sjostrom. Price Discrimination by Shipping Conferences. Logistics and Transportation Review, Jun. 1992, [from Dialog® File 15, Acc. No. 00727777 93-76998].
Stacklin. "Bridgestone Printing Unit Teams with ewinwin", Mar. 25, 2002, Crain's Cleveland Business, vol. 23, issue 12, 3 pages.

Tanaka. "As Other Companies Crumble, Ecount Carves Out Niche in Online-Payment Services." Knight Rider Tribune News Service, Washington, Feb. 27, 2002. (Recovered from ProQuest Database Dec. 4, 2006.).
"The Oil and Gas Asset Clearinghouse, a Pertoleum Place Company, to Host It's Second Exclusively Online Auction of Oil and Gas Properties on Aug. 14-16, 2000." PR Newswire, p. 5591, Aug. 3, 2000, 2 pages.
Thomas, et al. JIT: Strategies for Distant Suppliers (Abstract). Business, vol. 40, No. 4, pp. 36-39, Dec. 1990.
Wayback Machine. "Searched for http://www.ewinwin.com/corp/ewinwinwhitepaper.pdf" , Oct. 2, 2008, Archive.org.
Kantrow, American Express Sets a Three-Tier Pricing on Optima, Dialog: File 148 #05812190 (The Gale Group), American Banker, v157, n25, p. 1(2), Feb. 6, 1992.
OA Dated Feb. 6, 2009 for U.S. Appl. No. 09/626,296, 11 pages.
OA dated Apr. 29, 2009 for U.S. Appl. No. 10/464,585, 19 pages.
OA dated Jul. 2, 2009 for U.S. Appl. No. 09/426,063, 24 pages.
OA dated Sep. 9, 2009 for U.S. Appl. No. 11/556,604, 60 pages.
Mullich. Altrade Serves as a Natural Resource—A Head Start and Big Trading Volume Give the Natural Gas Marketplace a Competitive Edge. Can it Last? Information Week, 152, Jun. 12, 2000, 3 pages.
China—Welcome to the Machine: New Machinery, Electronics B-to-B Website Launched. China Online, Jul. 24, 2000, 1 page.
DomainTradeLIVE! Launched by solutionhome.com. Business Wire, Oct. 20, 1999, 1 page.
Beaty. Mass Customisation. Manufacturing Engineer, vol. 75, issue 5, Oct. 1996, pp. 217-220.
Easley, et al. Time and the Process of Security Price Adjustment, Journal of Finance, vol. 47, No. 2, Jun. 1992. http://ideas.repec.org/a/bla/jfinan/v47y1992i2p576-605.html. Last accessed Sep. 10, 2009, 30 pages.
Medrano, et al. Strategic Behaviour and Price Discovery, RAND Journal of Economics, vol. 32, No. 2, Jun. 21, 2001. https://editorialexpress.com/cgi-bin/rje_online.cgi?action=view&year=2001&issue=sum&page=221&&tid=83197&sc=uogfbloa. Last accessed Sep. 3, 2009, 29 pages.
MobShop Selected by WHN(TM) (WhatsHotNow.com (R), Inc.) to Power Demand Aggregation Within Its Licensed Merchandise Marketplace; Demand Aggregation Technology Enables Marketplaces to Improve Liquidity by Generating Volume Transactions, PR Newswire, San Francisco, Jan. 16, 2001. http://www.allbusiness.com/retail-trade/4291613-1.html.
O'Gorman, et al. Considerations for Connecting Renewable Generation into Bulk Supply Networks. Sixth International Conference on Advances in Power System Control, Operation and Management, ASDCOM 2003, vol. 2, Nov. 11-14, pp. 674-680. Last accessed Sep. 10, 2009, 7 pages.
Scott. Chains of Trust, Supply Chain Management, Manufacturing Engineer, vol. 75, issue 4, Aug. 1996, pp. 172-174.
Scott. Supply Partnerships in the Aerospace Industry. Transforming Your Material Flow: A Practical Insight Into World Class Logistics and Supply Chain Management IEE Colloquium on, Oct. 24, 1996, pp. 3/1-3/3.
Scott. Supply Partnerships and the Effective Management of Low Cost Components. Transforming Your Material Flow: A Practical Insight Into World Class Logistics and Supply Chain Management IEE Colloquium on, Mar. 19, 1996, pp. 2/1-2/4.
Watson. The Effects of Demand Forecast Fluctuations on Customer Service and Inventory Cost When Demand is Lumpy. Journal of the Operational Research Society, vol. 38, No. 1, pp. 75-82, Jan. 1987. http://www.palgrave-journals.com/jors/journal/v38/n1/abs/jors19879a.html. Last accessed Sep. 10, 2009, 8 pages.
Dibiase. The Inventory Simulator: A Micro Computer Based Inventory Model. Modeling and Simulation on Microcomputers, Paul F. Hogan, ed., Society for Computer Simulation (SCS), La Jolla, pp. 104-106, Jan. 1987.
OA dated Oct. 28, 2009 for U.S. Appl. No. 10/464,585, 37 pages.
OA dated Oct. 6, 2009 for U.S. Appl. No. 12/042,051, 53 pages.
OA dated Nov. 27, 2009 for U.S. Appl. No. 11/680,431, 43 pages.
Jonsson, et al. Impact of Processing and Queueing Times on Order Quantities. Mater. Flow, vol. 2, No. 4, pp. 221-230, Aug. 1985.

(56) References Cited

OTHER PUBLICATIONS

Market Engineering Research for Structural Impacts of e-Business in the European Chemicals Industry (Ch. 3), Structural Impact of e-Business on the Chemicals Industry, Frost & Sullivan, Market Research Report, Jun. 2001.
OA dated Feb. 23, 2010 for U.S. Appl. No. 09/426,063, 11 pages.
OA dated Mar. 19, 2008 for U.S. Appl. No. 11/152,462, 26 pages.
OA dated Apr. 16, 2010 for U.S. Appl. No. 12/042,051, 32 pages.
OA dated Apr. 29, 2010 for U.S. Appl. No. 10/464,585, 16 pages.
"Supplier pricing and lot sizing when demand is price sensitive". Abad, P.L. Fac. of Bus., McMaster Univ., Hamilton, Ont., Canada. European Journal of Operational Research, vol. 78, No. 3, p. 334-54. Date: Nov. 10, 1994 [recovered from Dialog on Oct. 20, 2009]. 1 page.
Efficient bid pricing based on costing methods for Internet bid systems Sung Eun Park; Yong Kyu Lee. Dept. of Comput. Eng., Dongguk Univ., South Korea. Book Title: Web Information Systems-WISE 2006. 7th International Conference on Web Information Systems Engineering. Proceedings (Lecture Notes in Computer Science vol. 42) [recovered from Dialog on ]. 1 page.
Swartz, Wireless Ads: Loved/Loathed. Wireless Review. © 2006 The Gale Group. Last accessed Sep. 17, 2010, 3 pages.
Mack, Going Local. © 2006 ProQuest Info&Learning. Last accessed Sep. 17, 2010, 2 pages.
OA dated Oct. 21, 2010 for U.S. Appl. No. 12/788,513, 62 pages.
OA dated Sep. 3, 2010 for U.S. Appl. No. 11/618,418, 125 pages.
OA dated Sep. 17, 2010 for U.S. Appl. No. 11/618,412, 97 pages.
De Gheest, Computer Implemented Electronic Bidding for Electronic Sales Application. Derwent Acc No. 2001-006585, © 2010 Derwent Information Ltd. Last accessed Sep. 17, 2010, 2 pages.
OA mailed Mar. 21, 2011 for U.S. Appl. No. 12/887,778, 38 pages.
OA mailed Jan. 21, 2011 for U.S. Appl. No. 12/881,923, 48 pages.
OA mailed Feb. 23, 2011for U.S. Appl. No. 11/618,412, 27 pages.
OA mailed Feb. 18, 2011 for U.S. Appl. No. 11/680,431, 33 pages.
OA mailed Mar. 28, 2011 for U.S. Appl. No. 11/618,418, 22 pages.
OA dated Aug. 18, 2011 for U.S. Appl. No. 12/881,923, 32 pages.
OA dated Jul. 28, 2011 for U.S. Appl. No. 12/704,280, 55 pages.
OA dated Sep. 2, 2011 for U.S. Appl. No. 11/680,431, 24 pages.
OA dated Sep. 12, 2011 for U.S. Appl. No. 09/922,884, 31 pages.
OA dated Sep. 21, 2011 for U.S. Appl. No. 13/106,622, 52 pages.
U.S. Appl. No. 13/269,360 Final Office Action mailed Jul. 6, 2012.
U.S. Appl. No. 12/710,095 Final Office Action mailed Jun. 28, 2012.
U.S. Appl. No. 12/881,923 Office Action mailed Jun. 29, 2012.
U.S. Appl. No. 13/345,681 Office Action mailed Jun. 20, 2012.
U.S. Appl. No. 11/618,412 Final Office Action mailed May 1, 2012.
Amazon.com, "Earths Biggest Selection," Jun. 30, 2001, archived by Archive.org: http://web.archive.org/web/20010630130618/http://www.amazon.com/exec/obidos/subst/home/home.html.
Anon., "ELCOM: Virgin Trains Cuts Procurement Costs with elcom. com; New Electronic Ordering System Offers Personalised Pricing," M2 Presswire, Jul. 18, 2000.
Anon., "Open Market Introduces New Software for Dynamic Web-Based Commerce" PR Newswire, Oct. 1, 1996.
Boroshok, Jon, "Wireless, Location-Based, Shopping Portal being Tested in New York City and San Francisco by GeePS.com, Inc.," published Apr. 3, 2000, New York, NY and San Francisco, CA; as downloaded from http://www.techmarcom.com/geeps.html on Jan. 6, 2012.
Business/High Tech Editors "Mercata Launches Compelling Alternative to Online Auctions," Business Wire, Nov. 15, 2000.
ebay.com "eBay Services: The Feedback Forum," Aug. 1, 2001, archived by archive.org: "http://web.arch ive.org/web/20010801145144/http://pages.ebay.com/services/forum/feedback.html".
Garner, K., "Culture Vulture: Up from Under—Germaine Greer," Off our Backs, Jun. 24, 1971, vol. 1, Iss. 23, p. 14.
Ha, Sung Ho et al., "Matching Buyers and Suppliers: An Intelligent Dynamic-Exchange Model," IEEE Intelligent Systems, 2001.
Hinze, Annika et al., "Location- and Time-Based Information Delivery in Tourism," as downloaded Apr. 20, 2012 from http://page.mi.fu-berlin.de/voisard/Papers/sstd03.pdf.
IEEE Xplore Search Results, Aug. 12, 2007.
Kauffman et al., "Bid Together Buy Together, On the Efficacy of Group-Buying Business models in Internet-based Selling," May 16, 2001.
Mercata.com "How to Ship an Order" Oct. 22, 2000, archived by archive.org: http://web.archive.org/web/20001022035135/http://www.mercata.com/cgi-bin/mercata/mercata/v1/pages/editorial.jsp?name=Ship+an+Order.
Mercata.com, archived by archive.org on or before Jun. 19, 2000.
Millman, H., "Legacy Data Links Shrinks Costs," InfoWorld, vol. 20, No. 1, pp. 51, 56, Jan. 5, 1998.
Rajaraman, Rajesh et al., "The Effect of Demand Elasticity on Security Prices for the Poolco and Multi-Lateral Contract Models," IEEE Transactions on Power Systems, vol. 12, No. 3, Aug. 1997.
Rozic, Jeff "Who's Watching While You Surf?" Inside Business 3, 5, 64, May 2001.
Tippr http://www.tipper.com/ Internet Archive (Feb. 29, 2008)— http://web.archive.org/web/20080229121727/http://tippr.com/.
WHN Selects MobShop to Power Aggregated Buying for WHN Exchange. Jan. 23, 2001. http://www.allbusiness.com/retail-trade/4291613-1.html. Last accessed Sep. 11, 2009, 2 pages.
U.S. Appl. No. 09/922,884 Final Office Action mailed Jan. 4, 2012.
U.S. Appl. No. 13/104,723 Office Action mailed Mar. 22, 2012.
U.S. Appl. No. 13/106,622 Final Office Action mailed Jan. 3, 2012.
U.S. Appl. No. 13/270,133 Office Action mailed Jan. 3, 2012.
U.S. Appl. No. 12/710,095 Office Action mailed Apr. 6, 2012.
U.S. Appl. No. 13/161,192 Office Action mailed Apr. 5, 2012.
U.S. Appl. No. 13/251,668 Office Action mailed Feb. 9, 2012.
U.S. Appl. No. 13/251,668 Final Office Action mailed Apr. 17, 2012.
U.S. Appl. No. 13/160,128 Final Office Action mailed Feb. 22, 2012.
U.S. Appl. No. 13/105,387 Office Action mailed Jan. 3, 2012.
U.S. Appl. No. 13/272,147 Office Action mailed Jan. 10, 2012.
Adam et al. "Strategic Directions in Electronic Commerce and Digital Libraries: Towards a Digital Agora". *ACM Computing Surveys* [Online] 1996, vol. 28, Issue 4, pp. 818-835.
U.S. Appl. No. 13/271,464 Office Action mailed May 10, 2012.
U.S. Appl. No. 09/922,884 Office Action mailed May 1, 2012.
U.S. Appl. No. 13/104,723 Final Office Action mailed Jun. 8, 2012.
U.S. Appl. No. 13/270,133 Final Office Action mailed Jun. 12, 2012.
U.S. Appl. No. 13/292,971 Office Action mailed Jun. 14, 2012.
U.S. Appl. No. 13/272,144 Office Action mailed May 16, 2012.
*eWinWin, Inc.* v. *Groupon, Inc.* Appeal Per Curiam Decision dated Oct. 9, 2012.
*eWinWin, Inc.* v. *Groupon, Inc.* Reply Brief of Appellant dated Jun. 4, 2012.
*eWinWin, Inc.* v. *Groupon, Inc.* Brief of Appellee dated May 17, 2012.
*eWinWin, Inc.* v. *Groupon, Inc.* Brief of Appellant dated Apr. 2, 2012.
Order re Motion for Summary Judgment dated Nov. 23, 2011.
eWinWin, Inc.'s Opposition to Groupon, Inc.'s Motion for Summary Judgment of Non-Infringement dated Nov. 8, 2011.
Groupon, Inc.'s Motion for Summary Judgment of Non-Infringment dated Oct. 17, 2011.
Order re eWinWin, Inc. Motion for Reconsideration dated Oct. 3, 2011.
Order re Claim Construction dated Sep. 5, 2011.
eWinWin, Inc. Supplemental Brief in Support of Claim Construction dated Aug. 24, 2011.
Groupon, Inc.'s Supplemental Claim Construction Brief dated Aug. 24, 2011.
eWinWin, Inc.'s Reply Brief in Support of Claim Construction dated Aug. 5, 2011.
Groupon, Inc.'s Responsive Claim Construction Brief dated Aug. 5, 2011.
Groupon, Inc.'s Opening Claim Constructin Brief dated Jul. 5, 2011.
Opening Claim Construction Brief of eWinWin, Inc.dated Jul. 5, 2011.
U.S. Appl. No. 13/275,054 Final Office Action mailed Nov. 5, 2012.
U.S. Appl. No. 13/292,971 Office Action mailed Dec. 4, 2012.
U.S. Appl. No. 13/292,971 Office Action mailed Sep. 14, 2012.
U.S. Appl. No. 13/449,275 Office Action mailed Oct. 4, 2012.

(56) References Cited

OTHER PUBLICATIONS

U.S. Appl. No. 13/449,276 Office Action mailed Sep. 26, 2012.
U.S. Appl. No. 13/449,658 Office Action mailed Oct. 30, 2012.
U.S. Appl. No. 13/452,647 Office Action mailed Dec. 7, 2012.
U.S. Appl. No. 13/460,512 Office Action mailed Dec. 10, 2012.
U.S. Appl. No. 13/523,820 Office Action mailed Nov. 8, 2012.
U.S. Appl. No. 13/525,040 Office Action mailed Nov. 23, 2012.
U.S. Appl. No. 13/407,622 Office Action mailed Dec. 3, 2012.
U.S. Appl. No. 13/407,622 Office Action mailed Sep. 12, 2012.
U.S. Appl. No. 12/881,923 Final Office Action mailed Oct. 5, 2012.
U.S. Appl. No. 13/251,668 Office Action mailed Sep. 14, 2012.
U.S. Appl. No. 13/345,681 Final Office Action mailed Sep. 20, 2012.
U.S. Appl. No. 13/621,158 Office Action mailed Dec. 5, 2012.
U.S. Appl. No. 13/274,213 Final Office Action mailed Aug. 1, 2012.
U.S. Appl. No. 13/538,302 Office Action mailed Oct. 25, 2012.
U.S. Appl. No. 13/105,387 Final Office Action mailed Aug. 15, 2012.
U.S. Appl. No. 11/618,418 Final Office Action mailed Jul. 26, 2012.
U.S. Appl. No. 13/517/528 Office Action mailed Dec. 6, 2012.
Mercata.com, "Our Privacy Policy", Archived by Archive.org on or before May 26, 2000.
Mercata.com, "Special Offers", Archived by Archive.org on or before Jun. 19, 2000.
Mercata.com, "Terms of Use", Published by Mercata.com, Nov. 6, 2000.
We-Commerce.com, "The We-Commerce™ Network Mission", Archived by Archive.org on or before Oct. 23, 2000.
U.S. Appl. No. 13/104,723 Office Action mailed Feb. 22, 2013.
U.S. Appl. No. 13/269,360 Final Office Action mailed Apr. 17, 2013.
U.S. Appl. No. 13/270,133 Final Office Action mailed Feb. 1, 2013.
U.S. Appl. No. 13/275,054 Final Office Action mailed Feb. 21, 2013.
U.S. Appl. No. 13/292,971 Final Office Action mailed Apr. 18, 2003.
U.S. Appl. No. 13/449,275 Final Office Action mailed Feb. 22, 2013.
U.S. Appl. No. 13/449,276 Final Office Action mailed Feb. 25, 2013.
U.S. Appl. No. 13/452,647 Final Office Action mailed May 2, 2013.
U.S. Appl. No. 13/460,478 Final Office Action mailed Apr. 29, 2013.
U.S. Appl. No. 13/460,478 Office Action mailed Dec. 20, 2012.
U.S. Appl. No. 13/460,512 Final Office Action mailed May 2, 2013.
U.S. Appl. No. 13/523,820 Office Action mailed Feb. 26, 2013.
U.S. Appl. No. 13/491,449 Final Office Action mailed May 2, 2013.
U.S. Appl. No. 13/491,449 Office Action mailed Dec. 19, 2012.
U.S. Appl. No. 13/525,040 Final Office Action mailed Apr. 18, 2013.
U.S. Appl. No. 13/407,622 Final Office Action mailed Apr. 17, 2013.
U.S. Appl. No. 13/609,806 Final Office Action mailed May 1, 2013.
U.S. Appl. No. 13/609,806 Office Action mailed Jan. 10, 2013.
U.S. Appl. No. 13/251,668 Office Action mailed May 10, 2013.
U.S. Appl. No. 13/251,668 Final Office Action mailed Dec. 24, 2012.
U.S. Appl. No. 13/609,250 Office Action mailed Jan. 3, 2013.
U.S. Appl. No. 13/621,158 Final Office Action mailed Mar. 27, 2013.
U.S. Appl. No. 13/274,213 Office Action mailed Apr. 23, 2013.
U.S. Appl. No. 13/274,213 Final Office Action mailed Jan. 9, 2013.
U.S. Appl. No. 11/152,462 Office Action mailed Feb. 6, 2013.
U.S. Appl. No. 13/160,128 Office Action mailed May 23, 2013.
U.S. Appl. No. 13/160,176 Office Action mailed Apr. 19, 2013.
U.S. Appl. No. 13/538,302 Final Office Action mailed Mar. 26, 2013.
U.S. Appl. No. 13/272,147 Final Office Action mailed Jan. 9, 2013.
U.S. Appl. No. 11/680,431 Office Action mailed Mar. 11, 2013.
U.S. Appl. No. 13/517/528 Office Action mailed May 8, 2013.
U.S. Appl. No. 13/584,809 Office Action mailed Feb. 14, 2013.
OA dated Apr. 6, 2011 for U.S. Appl. No. 12/788,513, 38 pages.
U.S. Appl. No. 13/681,403 Office Action mailed Aug. 21, 2013.
U.S. Appl. No. 13/270,133 Office Action mailed Jun. 21, 2013.
U.S. Appl. No. 13/523,820 Final Office Action mailed Jun. 28, 2013.
U.S. Appl. No. 13/891,154 Office Action mailed Aug. 28, 2013.
U.S. Appl. No. 12/881,923 Office Action mailed Sep. 20, 2013.
U.S. Appl. No. 13/621,158 Office Action mailed Oct. 11, 2013.
U.S. Appl. No. 13/105,441 Office Action mailed May 31, 2013.
U.S. Appl. No. 11/152,462 Final Office Action mailed Aug. 22, 2013.
U.S. Appl. No. 12/704,151 Office Action mailed Jul. 30, 2013.
U.S. Appl. No. 13/105,387 Office Action mailed Jun. 4, 2013.
U.S. Appl. No. 11/680,431 Final Office Action mailed Jun. 27, 2013.
U.S. Appl. No. 13/584,809 Office Action mailed Jul. 24, 2013.

* cited by examiner

DISCOUNTS IN A MOBILE DEVICE

CROSS-REFERENCE TO RELATED APPLICATIONS

This application is a continuation-in-part of co-pending U.S. application Ser. No. 10/867,625, filed Jun. 15, 2004 and entitled DYNAMIC DISCOUNT CARD TIED TO PRICE CURVES AND GROUP DISCOUNTS, the entirety of which is incorporated herein by reference.

BACKGROUND

The buying and selling of goods and services (collectively referred to as "products") has resulted in a vast array of costing schemes, which are used to select the price at which such products are sold. One of the most common costing schemes which consumers encounter everyday is known as fixed pricing. According to this costing scheme, sellers set a fixed price for their products based on a past demand for the product and/or anticipated future demand. Buyers desiring to purchase products from the seller are each required to pay the same fixed price regardless of the number of products purchased. If a seller finds that the demand for a given product is greater or less than expected, the seller may later adjust the fixed price of the product to account for such findings. Although the fixed pricing provides a simple way for a seller to conduct business with multiple buyers, one drawback of this costing scheme is that it fails to reward buyers willing to purchase greater quantities of products. Accordingly, the discount quantity pricing scheme evolved.

The discount quantity pricing approach to costing involves pricing a product at different levels depending on the quantity of products a customer is willing to purchase. The more products a customer is willing to purchase, the lower the price. Sellers have incentive to lower price for large quantity buyers since the fixed costs associated with producing the product is spread over more items. Thus, sellers are able to make equal or greater profits despite the lowered price of the product. While volume pricing offers a benefit to larger buyers who are able to purchase large quantities of goods at one time, smaller buyers are often unable to obtain the lowered prices and therefore are more likely to "shop around" for the best available deal. This, in turn, hurts both the buyer and seller. For instance, the smaller buyer is burdened with needing to search for alternative deals and still often ends up paying a higher price than larger buyers. The sellers, on the other hand, are faced with lost business since they are unable to reduce their price for the smaller buyers and still make sufficient profit.

Another common costing scheme for pricing a product is an auction. In an auction, a seller sets an initial price for an item and then multiple buyers are given an opportunity to bid against each other for the product. The buyer having placed the highest bid for the product at the end of the auction purchases the product at the final price bid. In order to provide a larger forum for buyers and sellers, a recent trend has been to auction goods electronically over the Internet. For example, one company known to operate an auction site over the Internet is eBay, Inc. Although auctions provide advantages when selling unique products for which customers are willing to competitively bid, the auction forum is not well suited for sellers desiring to sell large quantities of goods to multiple buyers given the inherent inefficiencies involved with selling one product at a time in a bidding environment.

Yet another costing scheme, which has been advanced in recent years, is buyer-driven bidding. According to this costing scheme, a single buyer desiring to obtain a product communicates a price at which the buyer is willing to purchase the product to multiple sellers. Each of the sellers is provided an opportunity to review the buyer's price. A sale is complete when one of the sellers agrees to sell the product to the buyer at the price suggested by the buyer. A buyer-driven bidding scheme is described in U.S. Pat. No. 5,794,207 assigned to Walker Asset Management Limited Partnership of Stamford, Conn. While the buyer-driven bidding scheme provides advantages for certain types of transactions when, for example, sellers may be willing to sell products at lower than normal prices, the uncertainties involved with whether a buyer's offer will be accepted is often problematic for high volume commercial transactions in which the reliability that a transaction will be complete is of paramount importance.

While the costing schemes described above have various advantages and disadvantages in different situations, a commonality among all of the costing schemes is that each buyer operates independently with one or more sellers to set a purchase price of a product. For example, in the fixed pricing scheme and discount quantity purchasing scheme, buyers individually determine whether the sellers preset price schedule is acceptable regardless of whether other buyers have decided to purchase the product or not. In an auction, not only do buyers operate independent of other buyers but, in fact, each buyer's decision to place a bid has a negative effect on all other buyers desiring to purchase the same good since the price of the good increases. Similarly, in a buyer-driven bidding scheme, each buyer is completely unaware of the amount other buyers are bidding for a given product.

The independent operations of the buyers stems from a combination of the fact that: 1) the costing schemes discussed above provide little incentive for buyers to work together and 2) there are large inconveniences for buyers to facilitate communication about their buying activities to other buyers. Unfortunately, such independent operation by buyers can result in missed opportunities for both the buyer and seller. For example, in instances where two independent buyers are unable to afford a product, neither buyer informs the seller of their respective desire to purchase the product. Accordingly, sales of the product to these buyers do not take place. Due to the independent operations by each of the buyers, such information is never communicated thereby resulting in missed opportunities for both the buyers and seller alike.

SUMMARY

The following presents a simplified summary in order to provide a basic understanding of some aspects of the claimed subject matter. This summary is not an extensive overview. It is not intended to identify key/critical elements or to delineate the scope of the subject invention. Its sole purpose is to present some concepts in a simplified form as a prelude to the more detailed description that is presented later.

Briefly described, the subject disclosure pertains to systems and methods directed toward universal discount and demand aggregation. More particularly, mechanisms are provided to assist consumers in participating in group buying by transparently recording and aggregating purchases of a single consumer with the transactions of an entire group of consumers. Participation in group buying is reciprocated with rewards, discounts, special deals and the like from sellers accepting group buys. For some sellers, it is difficult to generate new business opportunities and to create customer loyalty. For example, advertising in periodicals or on television and/or radio are broad, undirected means of advertising. Consumers captured by such methods may only be seeking a short term deal and follow the lowest price. By grouping consumers and aggregating the grouping's purchases, sellers may interact with the grouping as if it were a single large volume purchasing entity. Accordingly, sellers are in a better position to offer rebates, rewards, discounts and the like to the grouped consumers, thus generating new business and cultivating loyalty. Consumers likewise benefit by receiving rewards for their participation.

According to aspect of this disclosure, a purchase data server is provided that includes an aggregation component and a discounting component. The aggregation component records transactions of consumers in a buying group and aggregates the recorded transactions with those of the entire group. The discounting component retains reward policies established by a plurality of sellers. The discounting component releases a reward to universal discount cards associated with members of the buying group whenever the aggregated purchases from a particular seller satisfies the terms and conditions of that seller's reward policy.

In accordance with another aspect of the claimed subject matter, a mechanism is provided to position, globally or geographically, a consumer and/or a universal discount card. Sellers may utilize the position to target specific consumers nearby with special advertisements and/or deals. Consumers may receive these special offers via the universal discount cards or a mobile device such as a cell phone, PDA (Personal Digital Assistant) or the like.

According to yet another aspect of the disclosure, mechanisms are provided to data mine recorded consumer purchasing history data. Consumer purchasing habits can be analyzed to determine patterns useful in providing more relevant advertisements, deals, and/or rewards. Thus, sellers receive relevant consumer purchasing data in exchange for participating in group buying and distributing rewards.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the subject invention is intended to include all such aspects and their equivalents. Other objects, advantages and novel features of the invention will become apparent from the following detailed description of the invention when considered in conjunction with the drawings.

DETAILED DESCRIPTION

The subject disclosure pertains to participating in demand aggregation in exchange for special rewards. More specifically, the disclosure is related to mechanisms that facilitate recording and aggregating of purchases transacted between buyers in a buying group and sellers participating with the buying group. In accordance with one embodiment, a purchase data server is provided. The search engine includes mechanisms to record purchase transactions between buyers and sellers for the purposes of aggregation. The aggregated purchases are tracked relative to reward policies established by the sellers participating with the buying group. When the terms and conditions of a reward policy are satisfied, a reward is released and distributed to universal discount cards associated with the buyers in the buying group. Various systems and methods are described hereinafter with respect to universal discounts and demand aggregation as well as relevant tools to aid such functionality.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Initially, what follows is an exemplary implementation of a demand aggregation system as well as a dynamic discount card system. It is to be appreciated that this is but one manner in which aspects of the disclosure can be employed. Others are possible and are to be deemed within the scope of the claimed subject matter. Further yet, additional details regarding the below described mechanisms and interactions can be found in the aforementioned patent application entitled DYNAMIC DISCOUNT CARD TIED TO PRICE CURVES AND GROUP DISCOUNTS, incorporated herein by reference.

Figure 1:
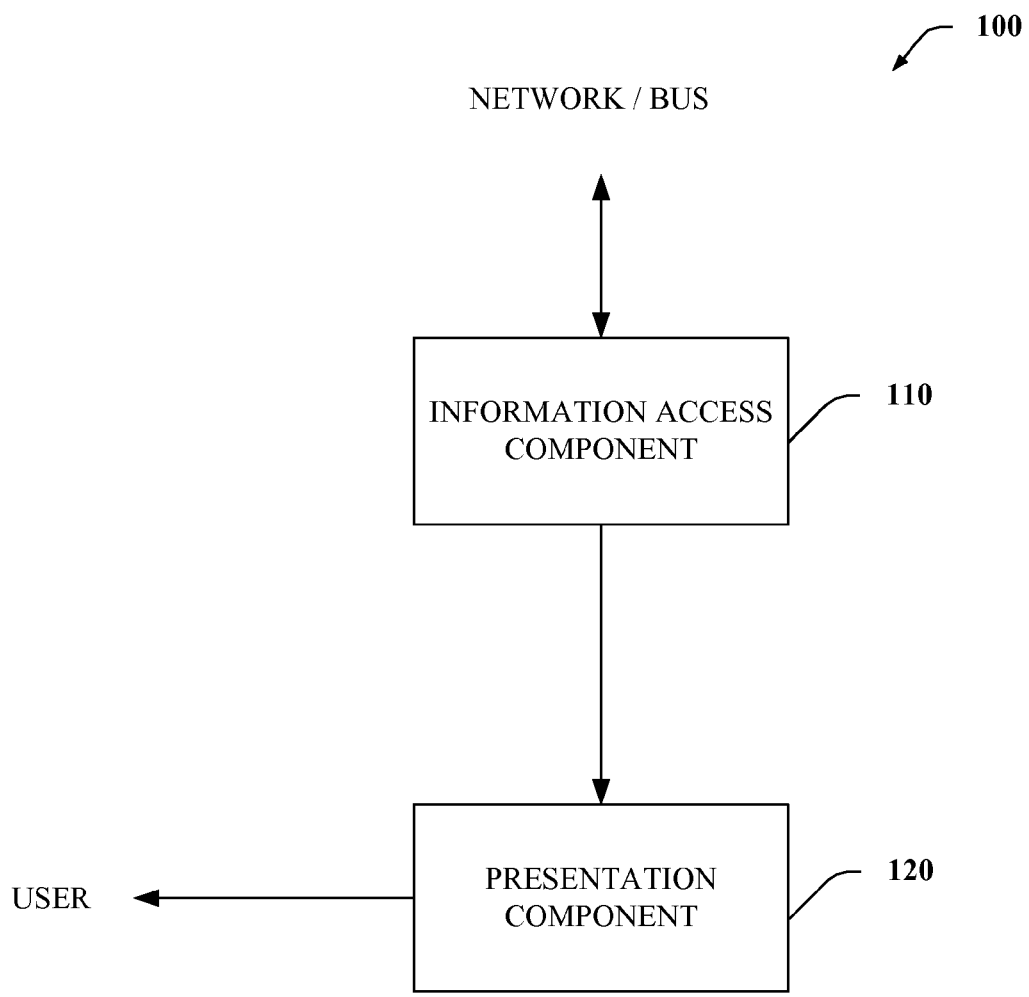
FIG. 1 illustrates a dynamic discount system in accordance with an aspect of the subject disclosure.

Referring initially to FIG. 1, a dynamic discount system 100 comprising an information access component 110 and a presentation component 120 is illustrated according to an aspect of the present invention. The dynamic discount system 100 can be utilized to access offers such as, for example, derived from shopping bots, catalogs, etc.

The information access component 110 communicates with a network and/or a bus and receives information related to price curves, quantities, etc. established by a wide variety of users (e.g., sellers). Thus, the information access component 110 can comprise a transmitter, receiver or both. For instance, the information access component 110 can be a receiver that obtains information wirelessly from a tower or a satellite.

Additionally, the information accessed via the information access component 110 is further provided to the presentation component 120. The presentation component 120 can comprise a display (not shown) to present information to a user and/or software to render the information into a displayable format. The display can provide audio information, visual information, touch, etc. to the user. Thus, information can be displayed to a user via the dynamic discount system 100. For example, the information access component 110 can receive updated price curves from a network, which can be provided to the presentation component 120. Furthermore, the presentation component 120 can display the updated price curves to the user.

By way of example, Enterprise Resource Planning (ERP) systems and a multitude of software vendors have attempted to bring into balance manufacturing supply with demand over time. Products, along with quantities ordered over time and order frequency, are tracked and evaluated. These programs can include scheduling software, ERP systems, forecasting methods, and, most recently, predictive analysis and demand algorithms, which help predict and manage estimated production. In many instances, these solutions have sought to estimate and respond to various demand scenarios and optimize return on assets or utilization rates while meeting customer demand regarding item, options and delivery schedules. In many instances, the production schedule can be managed to meet predicted or real demand. As a result, resources can then be effectively planned and managed.

Pricing software can be employed to optimize profit by understanding individual demand and costs to service a customer. A price is determined based on such characteristics. Pricing software can manage prices relative to individual customers. Price sensitivity tools, in addition to other metrics, can be provided to determine optimal price strategies and trade-offs.

The Internet has been a delivery tool to provide these solutions. New technologies such as wi-fi and PDA's (personal digital assistants) can further extend the solutions throughout ever-larger geographic areas for this updated information on demand.

Demand aggregation, as described infra, has established a fundamental, yet revolutionary, difference in existing ERP and pricing software thinking. Demand aggregation effectively enables a seller to offer products, volumes, options, ship dates and price curves tied to the volume ordered by an entire group of unrelated buyers in pre-production or simply before the item has ever been produced. The exact number of items to be produced, the types and final price depend upon the quantity ordered. Furthermore, the seller can provide multiple price curves and multiple ship dates at different thresholds for the same item to different buyers, essentially grouping buyers individually or in strategic sub-sets with a different set of products, options, and prices. Yet, inherent within the model set forth herein, every user (e.g., buyer) selecting the same ship date is helping other users (e.g., buyers and seller) reduce cost to produce items in question. Demand is grouped among unrelated buyers across states, countries and continents to lower prices. Mass customization occurs while the Internet is utilized to group users in optimal economic ordering quantities.

Numerous options and features can be utilized upon this software platform including smart pricing modules, segmenting individuals into different groups based on their ordering history, smart shopping bots for buyers, etc.

Translation software is available to take existing product catalogs and other pertinent information and translate that into group dynamic price curves. This translation software is also available as an XML-based or other data exchange format that could allow the demand aggregation offer to be created by a series of queries (e.g., a series of "What if" questions that determine changes in volumes, products, options, price-curves, ship dates, . . . ) that could be used to automatically populate an offer form and be made available to potential and existing users with some screening filters offered to the seller (e.g., D&B credit run on buyer first).

For instance, a company using any variety of pricing, ERP, catalog, etc. software can list 5,000 widgets for delivery in 5 days with a price per unit of $1.00. The demand aggregation translation software can translate the existing "what if 10,000 are ordered, what if 20,000 are ordered, what if 40,000 are ordered, etc." to create in real-time a price-discount curve tied to volume that can immediately be displayed for the buyers and compared to other available options.

The dynamic discount system 100 is an add-on feature that can be employed by a buyer to connect to offers presented by seller(s) in real-time and other "spot" offerings derived from shopping bots, catalogs, etc.

Figure 2:
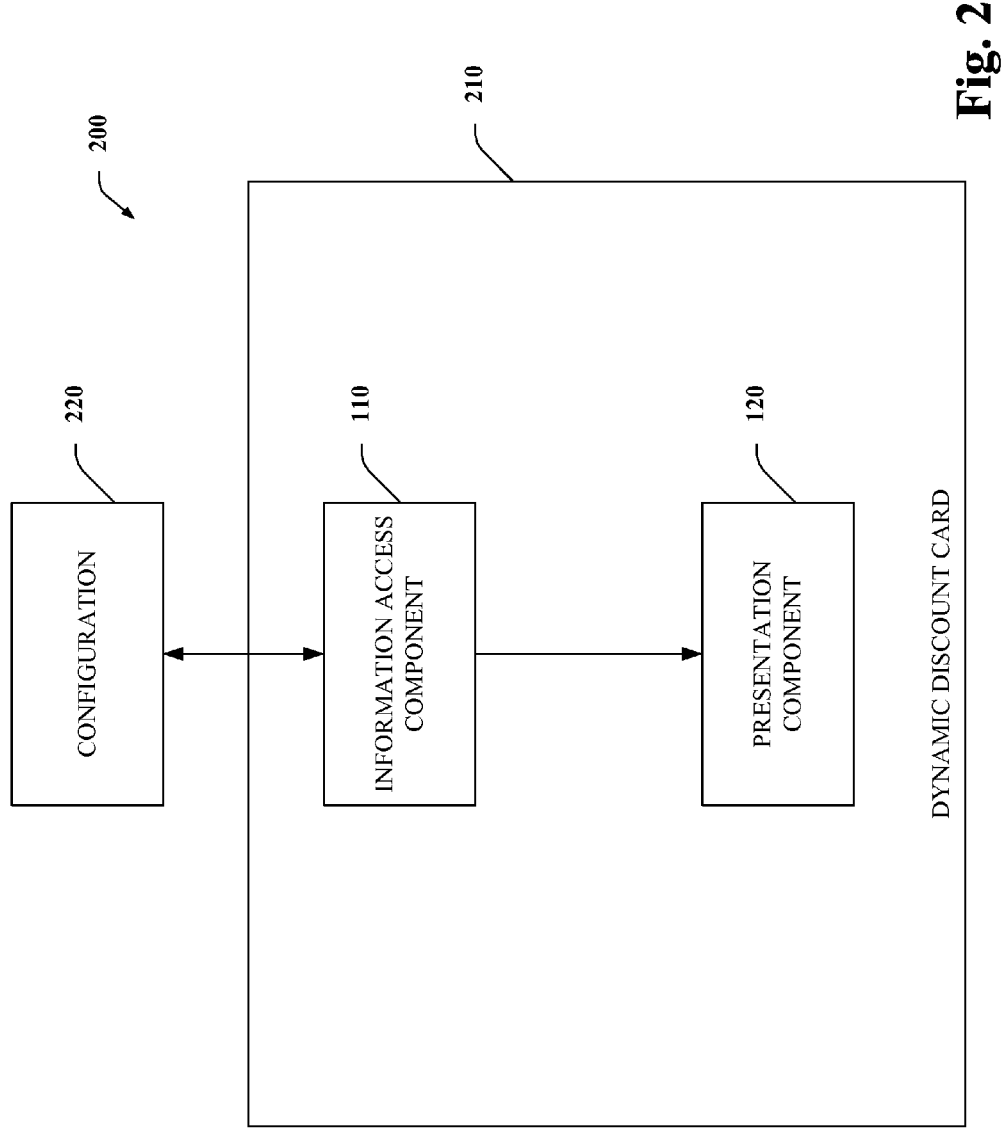
FIG. 2 is a block diagram of a dynamic discount card system.

Turning to FIG. 2, depicted is a dynamic discount card system 200 according to an aspect of the present invention. The system 200 comprises a dynamic discount card (DDC) 210 that is coupled to a configuration component 220. Additionally, the dynamic discount card 210 comprises the information access component 110 and the presentation component 120 from FIG. 1.

The configuration component 220 facilitates configuration of the dynamic discount card 210. For example, the configuration component 220 can initialize the information access component 110 such that the information received by the information access component 110 corresponds to a user's profile; therefore, the user can receive information associated with a group of goods and/or services offered by a seller(s). Additionally and/or alternatively, the configuration component 220 can be employed to preset a discount amount for a particular dynamic discount card 210. The configuration component 220 can configure the dynamic discount card 210 locally and/or remotely.

For purposes of understanding and not limitation, the following exemplary scenario is provided. The dynamic discount card 210 is mailed to a prospective buyer by a seller, media outlet, etc. Selected sellers send out electronic messages to the dynamic discount card 210 via the configuration component 220 (e.g., utilizing electronic, wi-fi, and other available methods) to provide updated product and price discount offers tied to volumes and ship dates/delivery dates that are stored on the card. Alternatively, the card 210 can be pre-loaded via a local configuration component 220 with default products and services at discount prices with only a buyer to enter the access code to initiate communication. In any event, the card 210 can show and/or recite the prices with a small voice activated chip (defaults can be set), the availability, and ship dates for the item in question, and other information via the presentation component 120.

Still yet another variation is for the discount card 210 to be loaded via the configuration component 220 with a profile of a cardholder (e.g., demographics, age, income, . . . ) that can interact with cable and other forms of communication (e.g., television). This information can be conveyed to a central database with pre-determined (e.g., based on age and income) protocols that show one or more advertisements to that individual or set of individuals holding respective cards 210. Likewise, specific prices (e.g., time based offer, discount, price curve . . . ) can be served up to the individual or set of individuals via the shared medium.

A targeted message can be cued and sent to the cardholder who is within range of that particular device. The customer, using the card 210, would then be able to respond to the offer as well as view the "localized" price and offer utilizing the presentation component 120. A default payment method can be stored in the card 210 with password protection or unique id coding and/or encryption technologies that enables the holder to execute the order at that time.

Figure 3:
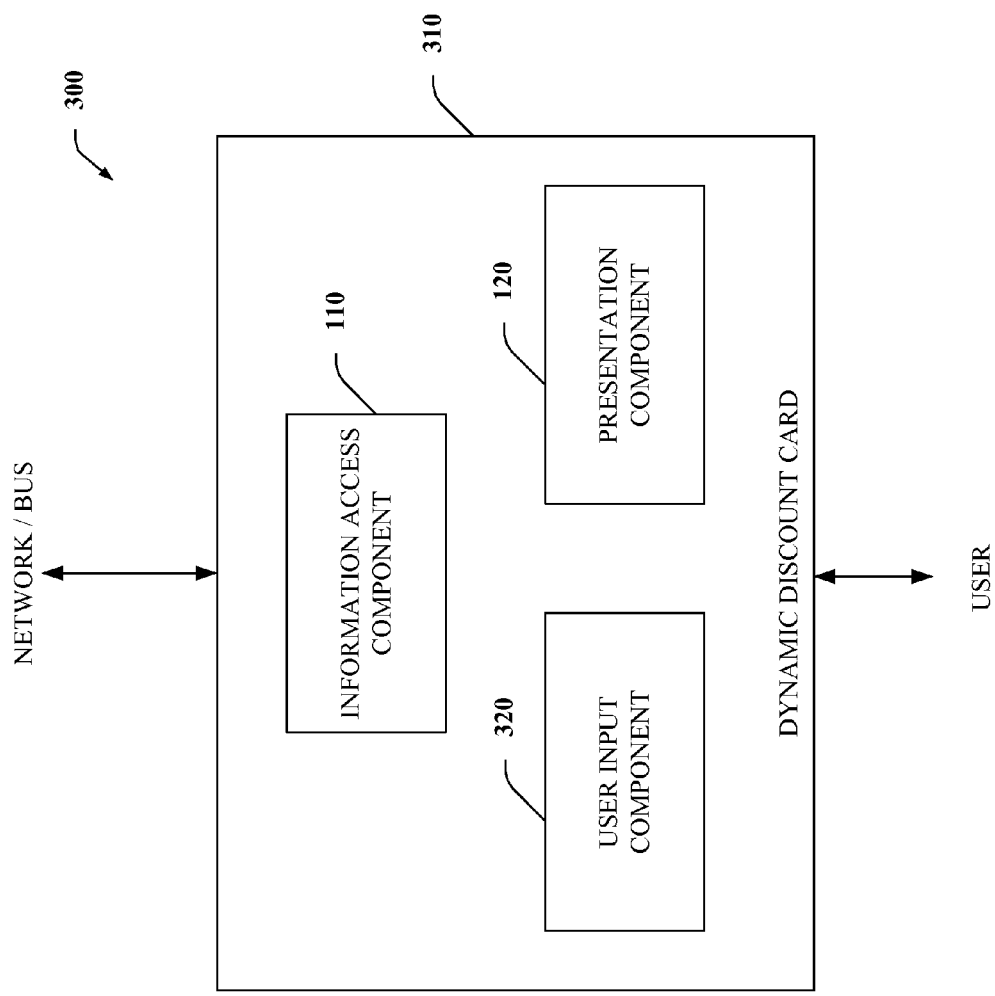
FIG. 3 illustrates a dynamic discount card system in accordance with an aspect of the subject disclosure.

Referring next to FIG. 3, a system 300 for interacting with a buyer is illustrated according to an aspect of the present invention. The system 300 comprises a dynamic discount card 310 that can interact with a network/bus and a user. For example, the dynamic discount card 310 can receive information related to a good and/or service offered by a seller from a wireless network. The information can be obtained by the dynamic discount card 310 via an information access component 110 and presented to a user utilizing a presentation component 120. The presentation component 120 can be, for example, software to convert the obtained information into a proper format and/or a hardware device such as a touch screen display, a display screen, a speaker, etc.

Furthermore, a user may interact with discount card 310 utilizing a user input component 320. For instance, the user input component 320 can be buttons on a surface of the card 310 to allow a user to view and manipulate information (thus, the user input component 320 can vary the information displayed via the presentation component 120). Additionally and/or alternatively, the user input component 320 can be a touch screen input and/or contain voice recognition software. Still further yet, the user input component 320 can be a magnetic strip on a surface of the card 310 to allow it to be read or programmed using a scanning device (not shown).

UNC (Uniform Naming Code) codes, or other methods to confirm product specificity, can be used to send/retrieve specific information. Voice recognition, impulse recognition, icons, radio frequency ID, and other messaging devices can be utilized to represent buyers' demand/order intention visibly and to optimize the capacity and time scenario faced by sellers by communicating with offers as well as senders/receivers. The card 310 can interact with an ERP and pricing model software as it translates available inventory and potential inventory for an item with benefits of demand aggregation. The communication can occur between a network of items including but not limited to demand card(s), handheld device(s), product(s), skid(s), container(s), ERP system(s), and vehicle(s). Order volumes can be changed employing the user input component 320 and their impact seen upon the presentation component 120 as well. Supplier and buyer(s) are offered the ability to change their quantities to see how it impacts the system as a whole. A buyer can see the same product represented in four different locations and have a freight estimator included to show total cost. In this scenario, the price of an item can be more expensive in location B, but the proximity of the product in location A may be cause it to be shown first when sorted by price.

Viewing options on the card 310 displayed with the presentation component 120 can include: product code, picture, current price, future price, availability, shipping added and final price, list of sellers, price history, ratings by seller, sorting by various options, filters on certain sellers, etc.

Furthermore, the current price can be shown with immediate delivery or a price curve (or some other graphical representation) shown along with the potential savings and the timeframe required. For example, the probability of the price dropping a certain percentage (e.g., 10%, 20% . . . ) such that the buyer can make an informed choice of either ordering the item for immediate delivery or placing an order and waiting for a discount to occur over time.

Another option can be for the buyer to provide a counter-offer utilizing the user input component 320, for instance, stating he will pay a 15% premium and/or a set price if the availability is within a specified period or even immediately available. The sellers of bots and price curves will have the ability to respond accordingly; however, the strength of the service is aggregating demand and the more time given the more advantage it is to not only the seller but to the buyers as a group.

The user can control the information and/or format of the information presented by the presentation component 120 by utilizing the user input component 320. The user input component 320 enables the dynamic discount card 310 to filter, sort, track, and retrieve offers. Additionally, the card 310 can be updated utilizing the latest bots and new price curves submitted. The total demand data is also available to sellers and buyers to review and see historical information and trends over time. A buyer can then order directly from the card utilizing the user input component 320 (e.g., by pressing order and confirm buttons, voice recognition . . . ). Additionally, the card 310 can provide a buyer more specific information regarding payment, delivery date, and whether to send elsewhere as an FYI. The card 310 can also be integrated with a variety of items including but not limited to laptops, personal digital assistants, cell phones, car panels, transporters, televisions, billboards with the code specified, id numbers, scanners, or wherever a receiving chip can receive updated signals from sellers.

According to another example, a seller can send out directed mail pieces with unique discount codes printed on the dynamic discount card 310 for a new buyer to try a particular product or service. In such a case, the card 310 can be activated only for a short-period but reflect changing discounts that are updated to the card 310 as an enticement to order from this seller. In addition, messages can be sent to the dynamic discount card 310 from the network when product availability changes and prices need to be adjusted in real-time (e.g., available quantity is sold out, next price shown). Moreover, the card 310 could be programmed to reflect these changes as they are made by the seller's selling software (dynamic discounts).

At the conclusion of the period, one type of card 310 can be simply discarded. Other cards 310 can be set-up to receive offers from new sellers and their products and services via the network/bus. Still other cards 310 can interact with one another, providing comparative pricing information that can then be used and stored by the other person.

When a buyer orders, the price discount shown on the display (e.g., presentation component 120) can be confirmed and sent to the seller. For example, the information access component 110 can send the order to the seller via the network/bus. All order information can be sent as well within the same digital transfer although this is not necessary. Shipping options/preferences as well can be programmed or a default provided. If the price is aggregated with others during a set period of time, the final price can be determined by the total volume ordered and shown to the buyer at that time. All products, prices, volumes, sellers, etc. can then be saved to the card 310 and/or sent to the user's home account on the Internet for future access, ported, etc.

An individual carrying a dynamic discount card 310 equipped with intelligence can be alerted to new price discounts and buying opportunities for select items that have been tagged by the user. Likewise, the same cards 310 can interface with one another, allowing a card to synch with another card. In such a case, a buying group (e.g., a purchasing co-op) could issue cards that carry their own dynamic discount cards 310 with select sellers. The cards 310 thus can create a network of buyers with access to current and future prices. The buyers' cards 310 can automatically synchronize demand among members for these items and track the numbers of the group as a whole. A buyer could opt to accept this price or alternatively accept a different one shown by the presentation component 120.

In some cases as a variation, sellers can choose to bid on the volume in real-time in which case a central buyer may be given authority to place the order on behalf of the group (with certain restrictions noted). In other cases, the issuing party is a publisher seeking to create value for readers while selling adjoining advertising space and seller fees for posting offers by product search code.

The code can be identified per individual user and can track the origination of the program by each message sent by the seller or originating source. For instance, one interpretation of the code 03380907 could as follows: 03 corresponds to a seller (e.g., Acme Inc.), 3 is a type of message (e.g., an electronic message), 8 is an address code with city and state, 0 is a type of customer (e.g., a direct user), 9 could correlate to a time sent and discount period open (e.g., two weeks), and 0 could be an actual discount (e.g., 10%) and 7 can be a unique code assigned to a product. Additionally it should be noted that a picture of the item as well as technical data could be sent along with the closest location.

The entire code number could be entered by the prospect with a press of the button upon the user input component 320 to see the entire price curve, future discounts, and a variety of other items currently available with the demand aggregation. An accept offer icon can be available such that a customer can submit acceptance by pressing a button or confirming via voice activation number sent. Other available options include but are not limited to various alerts timed to price and time period elapsed.

The code can be entered verbally, scanned, called in, etc., but the translator is able to take the unique pulse or id number once used and collate all orders as they arrive. A tracking system can facilitate determining a current volume of items ordered as well as available quantity left. The seller then has the ability to target different programs online or via voice activation by simply entering the corresponding code and making the change (e.g., all distributors receive an additional 5% off if the order is received within the next 24 hours).

Segments of DDC cardholders can be targeted as well based on a variety of preferences. For example, if a national equipment rental company has only a 35% rental rate in the Dallas market, an offer can be presented to the 1,000 cardholders within a 50 mile radius of the zip code indicating a new price curve or discount based on renting equipment from that location within the next 48 hours. A discount curve can be shown along with the final price that is calculated even after the product has been rented. In this case, a discount can be offered.

Management software enables the seller to post offers to different DDC members segmented by any number of criteria including but not limited to geography in real-time, personal profile, the volume ordered previously, and product bundling (e.g., if item X is ordered, Y is now 10% off).

The card 310 can be scanned as well through a variety of swipes that can make the "purchase" along with proper payment and debit/credit information. A "final" price can be determined by expiration of a period as well as a final volume ordered by the group along with discounts given along the way. Any limitations can be recorded in the unique number including payment terms, available credit, etc.

The card 310 can be updated automatically as well for the customer and those customers who have not yet ordered but have indicated they want to be updated on the progress of an offer. Furthermore, an alert can be sent when there is price movement down (certain signal) or up (different signal). The available quantity can also be shown in real-time along with a purchase when volume reaches X or price equals Z. An auto-order can be placed or the user can select an "alert me before placing order" that responds in kind.

Multiple products and offers can be received, stored and retrieved as required. A screening filter is also available (e.g., mycard) utilizing the user input component 320 to select those product/service categories most interested by the cardholder. The cardholder has the ability to turn off the offers as well based on any number of criteria. The card 310 then saves these requests and does not translate their respective transmissions, but instead filters them out accordingly (sellers can access this information). Filters can be engaged temporarily or longer. The card can be set-up by a myriad of ways that can be controlled by the provider of the card (e.g., no filters on select sellers) or filtered by the buyer (purchasing co-op defaulting to certain sellers over others). Furthermore, the cards 310 can interact with a central database of offers submitted by the seller and organized by an indexed system that can be searched.

A seller who issues a card 310 can be required to maintain a private password, code, etc. to access the card. While the discount cards 310 will interface with one another via various devices to update the latest prices and access codes, a provider of the card 310 can have a registration page and process that requires payment by the seller to show the prices in real-time to the group of buyers. If a seller purchases a product ID code to advertise, this can be seen on the display screen as well while the prices are being presented.

In addition, GPS can be utilized to interface with the cards 310 and show a graphical representation of everyone across the globe, their location, etc. A seller may request and pay to send a message to a group of select customers within a geographical area at a certain time. Likewise, they may pay to see what buyers have ordered a certain UNC item over the past two months and resend a new special that will be positioned first when these individuals select to search the item next. Again, placement and positions can be sold by the UNC number, location, and many other criteria or filtered out.

For example, a buyer could pull out the card 310, enter a hotel location and specify the number of nights utilizing the user input component 320 and see via the presentation component 120 the list of available hotels along with those with price curves (current and future prices), the shopping bots (current price), other opportunities (co-op price), or last minute opportunities provided by other sources. The card 310 would enable the buyer to see a comparison of the modules and place an order with one of his/her choice.

Dynamic discount cards 310 can also interface with the equipment and/or product themselves. In time, chips embedded in the item will respond to either the equipment as it is producing the product in question and/or the product as it is being delivered to inventory. The system can return price and an availability point according to this system as well which may be aggregated or unaggregated. An option can exist to calculate the transportation/freight cost and show the final price and availability to the buyer. The buyer can accept or reject this offer.

Dynamic discount cards 310 can also be sent to select buyers with certain built-in discounts based on company size, negotiated prices already established, etc. but will still integrate with the demand aggregation concept and shopping bots results. For example, a large buyer can have dynamic discount cards 310 with a seller's item showing a price of X. The card 310 receives dynamic pricing data from that seller via the information access component 110 and, in the event the price drops below X, the buyer(s) is alerted to this opportunity. Another example is to have a pre-negotiated "5% below the lowest price made public," which means the card 310 would register a price that is 5% below the lowest price available from this seller with the DDC 310 for that item. The price for this item(s) is automatically calculated by the card 310 and shown to all buyers with the presentation component 120. Yet another example is the card 310 that has a priority over other buyers by seeing the offer in advance. An offer would be sent via a signal from the network/bus to the DDC that denotes it as a "special" offer with limited review time.

A cardholder has the ability to search by product category, product item, seller by name, and a variety of other options. The search can be initiated by the user via the user input component 320.

In yet another example, a publisher, portal, search engine, etc. providing the dynamic discount cards 310 can have the activities of every member tracked accordingly. For instance, if two million dynamic discount cards 310 are issued and their activities are stored, that publisher has the ability to track in real-time the demand and purchasing activity online. This information can be bundled and sold to sellers, advertisers and other interested parties. The recipients of the DDC's 310 are notified of the terms and conditions surrounding this particular card and should accept or reject these conditions. Thus, how this information will be used is important for buyer as well as sellers involved. The buyer activity may be tracked in a wide range of segments including but not limited to:

Geography
Items (product codes as mentioned earlier)
When card was activated and activity since
Purchase prices and quantities
How purchased—demand aggregation, shopping bots, catalog access, etc.
Feedback on seller recorded and tracked
Ancillary products ordered
Pricing fluctuations
Product history
Personal preferences—filled out at time of card receipt Another variation is for the card 310 to simply assign a number to a particular discount % once confirmed. For instance, if a buyer selects an item from the DDC 310 and a price is shown along with a discount, a quick code can be generated. That code can then be saved and used by the buyer when he/she places the order (can be at a later time, attached to a purchase order, referenced at time of ordering, etc.). This code can be good for a certain time period (e.g., 24 hours) as specified by the seller. Again, different variations exist to allow for multiple codes to be issued to different buyers. If the code is not used within the specified time, the offer can lapse accordingly. The DDC 310 records and saves pertinent information on the buyer as well as the central database of all DDC 310 holders.

Yet another example, a seller can see the buyer has responded to 5 offers but has not placed a single order. The seller can seek to have this buyer blocked from the offer or otherwise restrict the buyer from placing an order.

Figure 4:
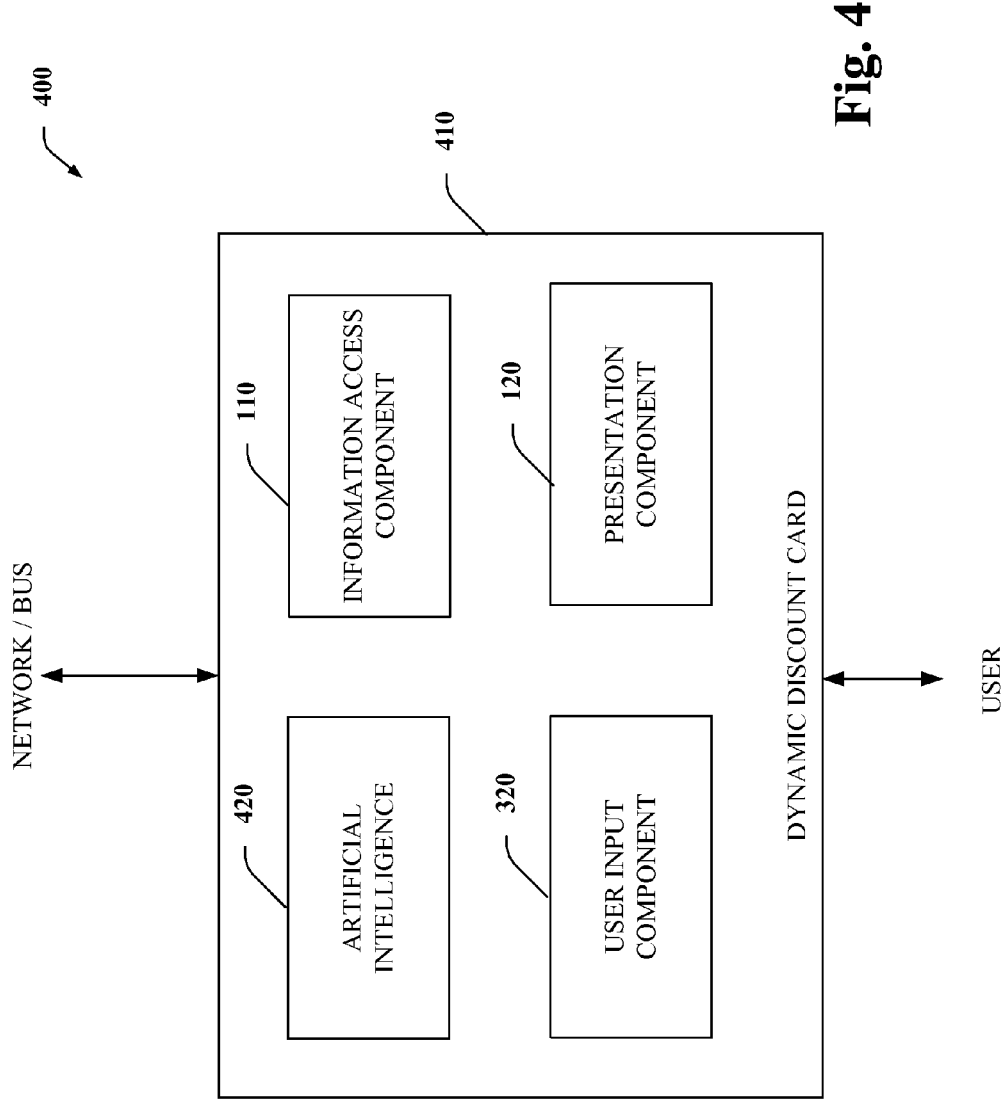
FIG. 4 illustrates a dynamic discount card system.

Turning to FIG. 4, illustrated is a dynamic discount card system 400 according to an aspect of the present invention. The system 400 comprises a dynamic discount card 410 that receives information to a user from a seller(s) via a network/bus and transmits information from the user to the seller(s). The dynamic discount card 410 comprises an information access component 110, a presentation component 120, and a user input component 320 as described supra. The dynamic discount card 410 can further comprises an artificial intelligence component 420.

The artificial intelligence component 420 can make inferences regarding information to display upon the card 410 utilizing the presentation component 120. Additionally and/or alternatively, the artificial intelligence component 420 can infer a user's intended input via the user input component 320. Therefore, the artificial intelligence component 420 can effectuate altering the displayed information upon the presentation component 120 in accordance with the performed inference. Alternatively, the artificial intelligence component 420 can accept an offer from a seller based upon the inference. The artificial intelligence component 420 can employ techniques such as, for example, Bayesian networks, support vector machines, etc. to perform such inferences. However, the present invention is not limited to these techniques to perform such inferences.

Figure 5:
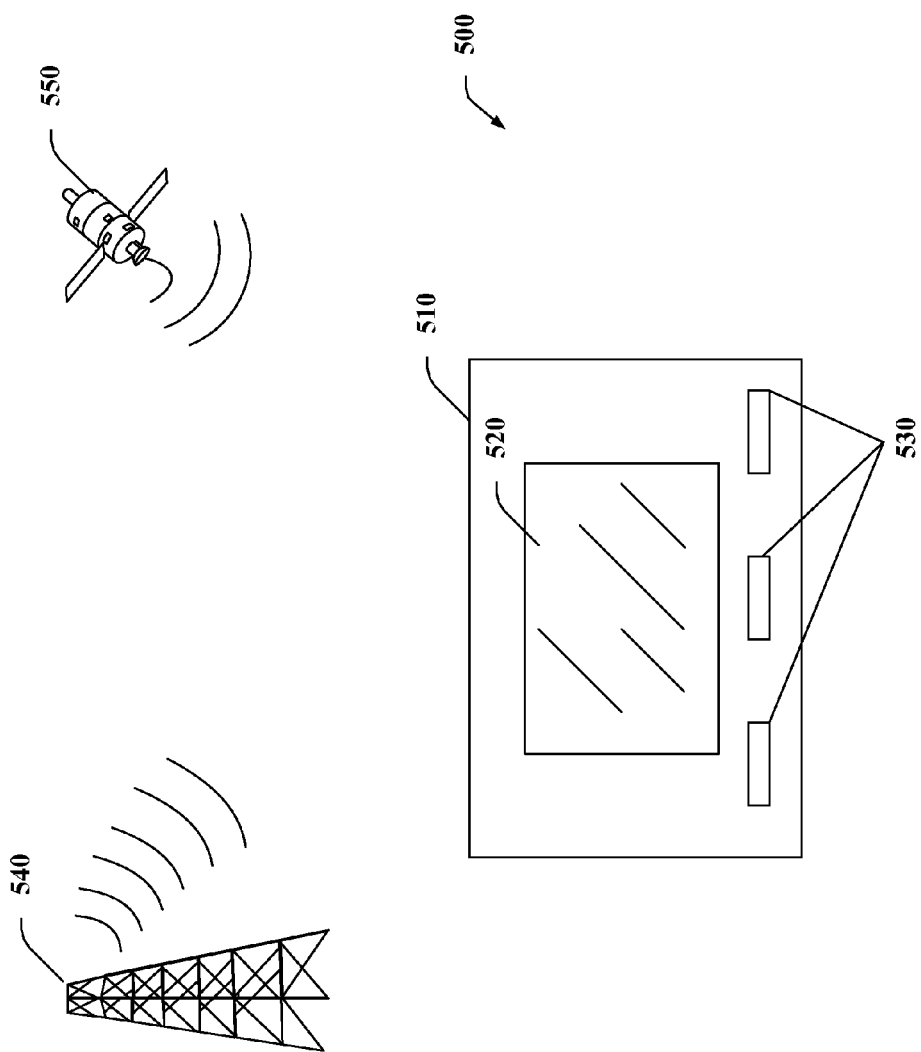
FIG. 5 is a block diagram of a dynamic discount card system in accordance with an aspect of the subject disclosure.

Turning now to FIG. 5, illustrated is a dynamic discount card system 500 according to an aspect of the present invention. The system 500 comprises a dynamic discount card 510, which has embedded intelligence/software that allows it to access the price curves, quantitites, etc. established by a wide variety of supplies as well as display results of other standard shopping bots that seek to find the lowest prices for the same product. For example, the card 510 can be a thin card with a visual display panel 520 thereupon. The card 510 can receive and display real-time updates from the price curves and show a variety of displays automatically (e.g., graphs, low to high, seller's location . . . ). Additionally, a user can interact with the dynamic discount card 510 by utilizing input devices (e.g., user input component 320) such as buttons 530.

The dynamic discount card 510 also can receive and transmit information. For example, the dynamic discount card 510 can receive/transmit information wirelessly utilizing a tower 540 and/or a satellite 550.

Figure 6:
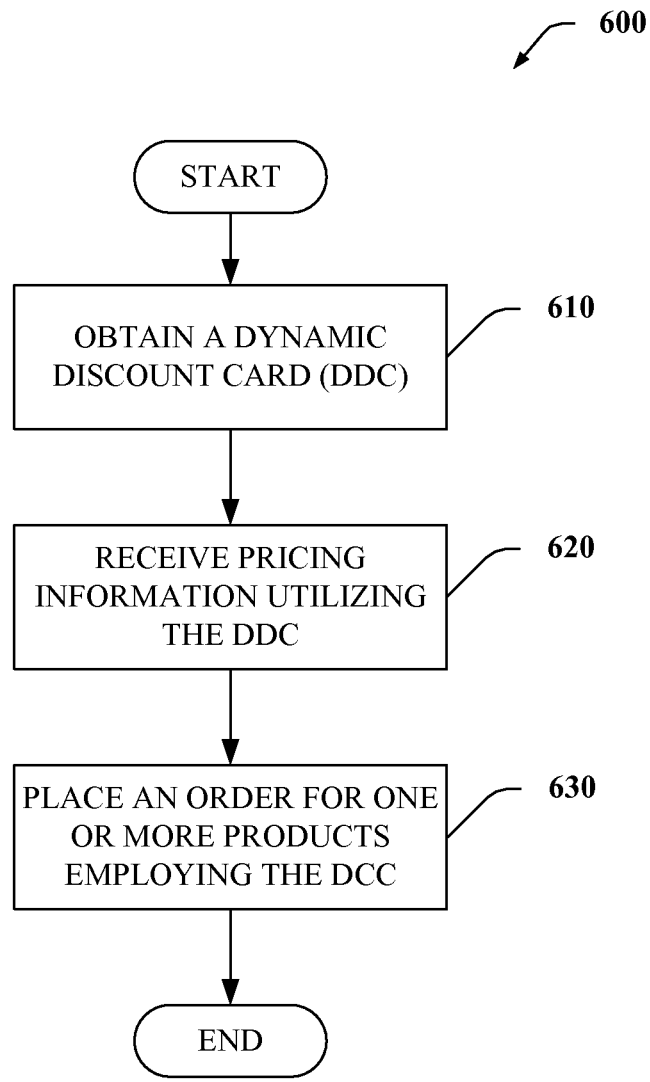
FIG. 6 is a flow diagram of a methodology for transacting business electronically in accordance with an aspect of the subject invention.

In view of the exemplary systems described supra, a methodology that may be implemented in accordance with the present invention will be better appreciated with reference to the flow chart of FIG. 6. While for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Turning to FIG. 6, a methodology 600 for transacting business electronically is illustrated in accordance with an aspect of the present invention. At 610, a dynamic discount card is obtained. At 620, the discount card is utilized to obtain pricing information about one or more products. As noted supra, the information can be obtained via the information access component 110 (FIG. 1). For example, the information can be obtained wirelessly and/or from a satellite. Furthermore, the information can be displayed to a user by employing a presentation component 120 (FIG. 1). Finally, at 630, the discount card is employed to place an order for one or more products. By way of example, the order can be placed by a user via a user input component 320 (FIG. 3).

What follows now are systems and methods for universal discount cards. Mechanisms are described wherein consumer purchases are aggregated and aggregation results matching certain criteria trigger the distribution of rewards to consumers. Consumers may purchase goods and/or services, for example, in the aforementioned manner. However, it should be appreciated that consumers are not limited to that method alone.

Figure 7:
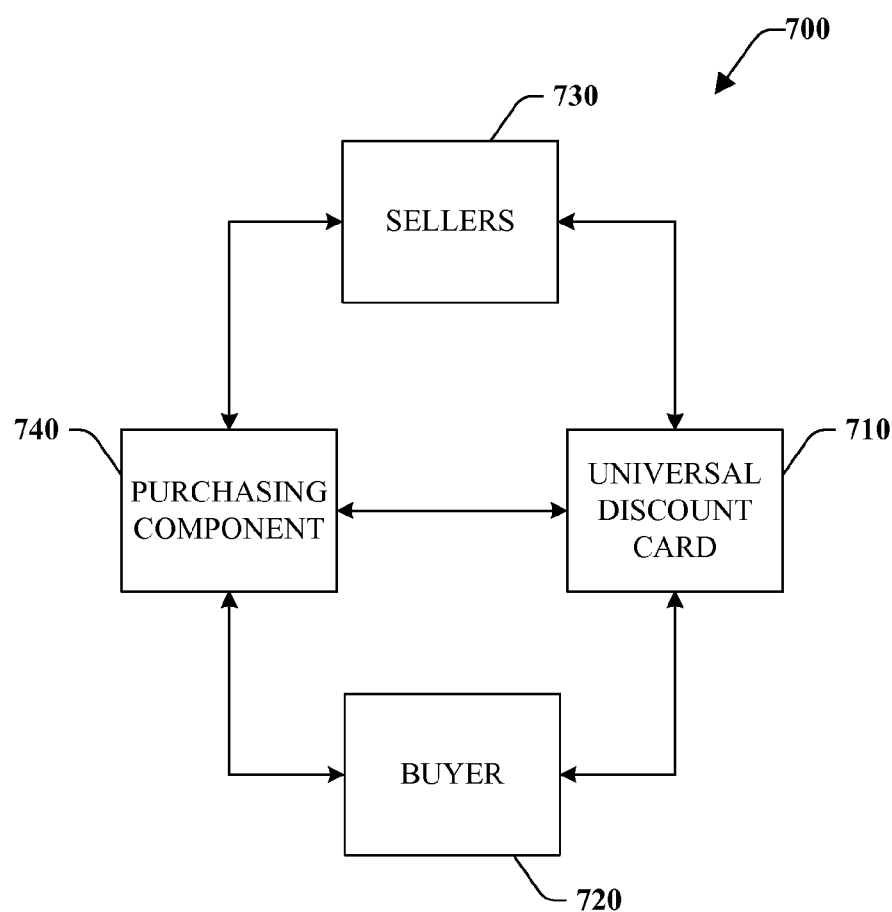
FIG. 7 is a block diagram of a universal discount system.

Turning initially to FIG. 7, a system 700 for providing discounts and special offers to a buying group is depicted. System 700 includes a plurality of buyers 720 that are members of a buying group and a plurality of sellers 730. Sellers 730 provide goods and/or services for purchase by buyers 720. Buyers 720 employ purchasing component 740 to purchase goods and/or services from sellers 730. According to one aspect of the subject disclosure, purchasing component 740 can be a special credit card issued to buyers 720 upon joining a buying group. A buying group may be established and optionally hosted by a variety of entities (e.g. seller group, charity, church, individual, for profit and/or non profit organization . . . ). An individual buyer wishing to join a particular buying group, registers with the buying group sponsor and accepts the term and conditions established by the sponsor. The special credit card identifies members of the buying group and enables buyer purchases to be tracked and aggregated. It is to be appreciated that the purchasing component 140 may be also be a special debit card, a deposit account, a personal credit card linked during registration, or any type of purchase vehicle that may be monitored for the purposes of aggregation.

In addition to purchasing component 740 associated with buyers 720, a universal discount card 710 is linked to each member of the buying group. According to one aspect, the universal discount card 710 may be a special card (e.g. a gift card, smart card . . . ) issued to buyers 720 upon joining a buying group or a personal card (e.g., credit card, debit card . . . ) linked to the system. It is to be appreciated that the universal discount card 710 need not be a physical card. For example, the universal discount card 710 may be linked to a buying group account or an online identity of a buyer. Accordingly, a username, an account number, or other such identifying marker may be used in place of a physical card. Further, a buyer may utilize a mobile device (e.g. a cellular phone, PDA . . . ) to implement the universal discount card 710. Still further yet, the universal discount card 710 can be embodied as a dynamic discount card 210, as previously described (or vice versa).

The universal discount card 710 enables, among other things, sellers 730 to reward buyers 720 for purchasing goods and/or services. As discussed supra, purchases of buyers 720 in a buying group conducted via the purchasing component 740 are aggregated. When aggregated purchase totals reach certain levels or thresholds, sellers 730 may release various rewards or offers to universal discount card 710. Buyers 720 may then collect the rewards or partake in the offers. These rewards or offers may include a gift certificate amount (e.g. a monetary amount employable universally or with a particular seller), a percentage discount on a future purchase, a special reduce price on a good and/or service, a percentage returned on purchases or other forms of reward.

To illustrate further, an exemplary situation is described. A buying group may negotiate with a book store to participate in the universal discount card system. Once seller participation is enlisted, purchases by buyers in the buying group at the book store are tracked and aggregated. The buyers employ purchasing component 740 (e.g., special credit/debit card, personal credit/debit card . . . ) to complete transaction so that the transaction may be recorded for aggregation. The purchasing component 740 may be utilized at physical locations of the book store and/or at an online store and still be aggregated. The book store may unilaterally determine the terms and conditions of its reward policy or the policy may be determined through negotiations between the buying group and the book store. One reward policy may be establishing a threshold purchase total wherein, after the threshold is met, a gift certificate cash amount is released to the buying group via the universal discount card 710. For example, when the buying group purchases $50,000 worth of books from the book store, the book store may release a $20 gift certificate for the book store to the buyers via the universal discount card 710. The universal discount card 710 may be a physical card such as a gift card or a smart card. The card can be presented to the book store during future purchases to be redeemed. Alternatively, universal discount card 710 may be an online account. A bar code representing the $20 gift certificate is deposited in the online account of buyers in the buying group. The bar code may be printed and subsequently presented to the book store. The bar code may also be displayed on the screen of a mobile device and scanned therefrom at the book store.

Figure 8:
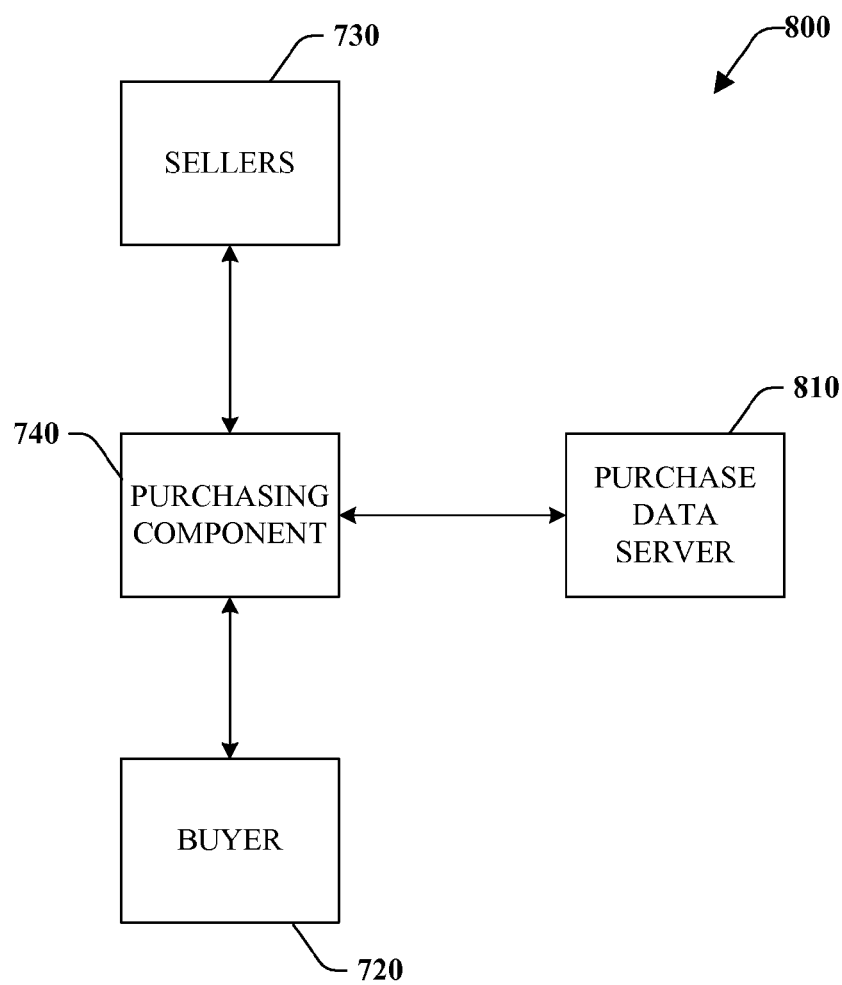
FIG. 8 is a block diagram of a universal discount system including a purchase data server.

Referring to FIG. 8, an aggregation system 800 for buyer purchases is provided. System 800 includes a purchases data server 810 that tracks and aggregates purchases transacted between buyers 720 and sellers 730. Purchases are conducted between buyers 720 and sellers 730 employing purchasing component 740. The purchase data server 810 records every transaction of buyers in a buying group made via the purchasing component 740. The purchase data server 810 may record the seller, the purchase amount, the buyer and the goods and/or services purchased. It should be appreciated that the purchase data server 810 may record any other information associated with the transaction.

The purchase data server 810 is accessible by both buyers 720 and sellers 730. Buyers 720 may access the purchase data server 810 to discover the activity of the buying group and review the reward policy of one or more sellers. For example, buyers 720 may determine a reward threshold level for a particular seller and the current progress of the buying group in meeting that threshold. Further, as described with reference to FIG. 7, universal discount card 710 may be an online account in addition to or instead of a physical card and buyers 720 may access the online account via the purchase data server 810 to retrieve rewards, discounts, specials offers and the like released to the universal discount card 710.

Sellers 730 may also access the purchase data server 810 to determine the purchases of buyer 720 as members of a buying group. Additionally, sellers 730 may also establish the terms and conditions of a reward policy for a buying group via the purchase data server 810. For example, sellers 730 employ the purchase data server 810 to establish a threshold purchase amount for the buying group to meet and an associated gift certificate amount, discount, special offer, and the like to be released once the threshold is satisfied. Further, sellers 730 may employ data mining techniques on the aggregated purchase data to determine buyer habits and the like. Sellers 730 can discover the types of goods and/or services the buying group is purchasing in order to target the buying group with more directed special offers and advertisements.

Figure 9:
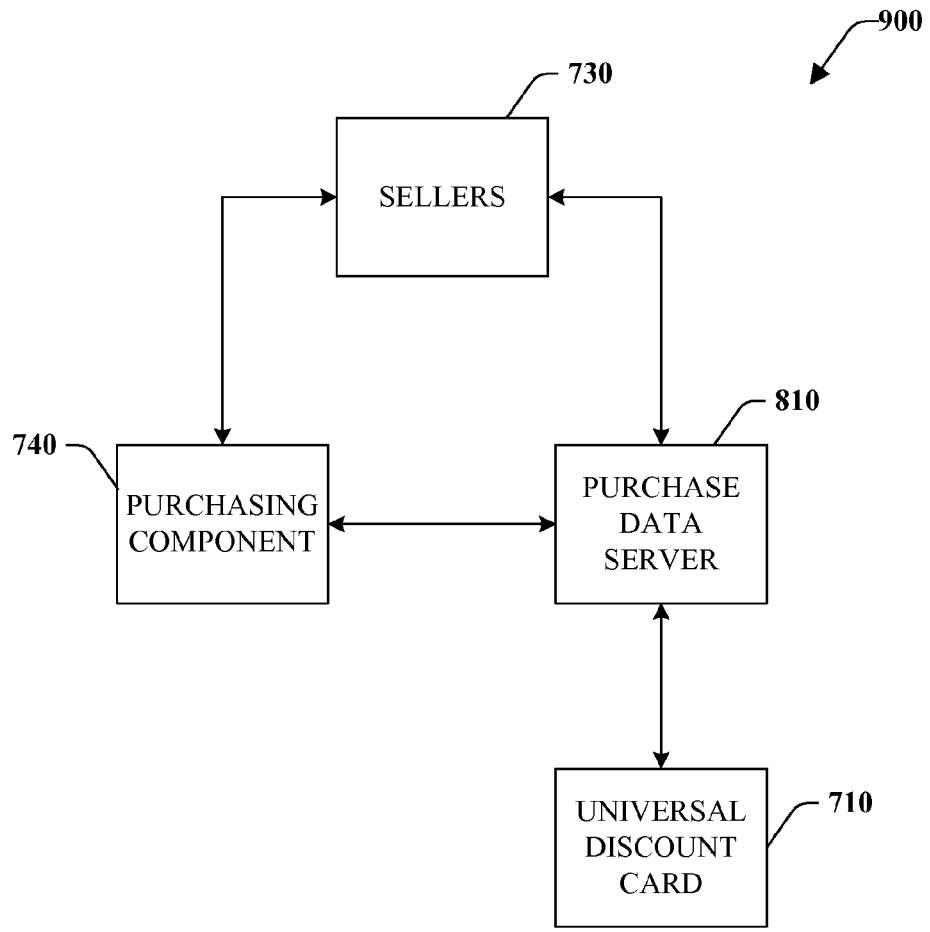
FIG. 9 is a block diagram of a universal discount card system.

Turning briefly to FIG. 9, an aggregation system 900 depicts the universal discount card 710 communicatively coupled to the purchase data server 810. While the purchase data server 810 and the universal discount card 710 are depicted as distinct and separate components, it should be appreciated that the components may be implemented as a single construct. For example, in accordance with one aspect of the subject disclosure, universal discount 710 may be an online account stored by the purchase data server 810. As described with reference to FIG. 8, sellers 730 establish the terms and conditions of the reward policy via the purchase data server 810. If the terms of the reward policy are met by the buying group, the associated reward, discount, and/or offer is released to the universal discount card 710. The reward may be automatically released to the universal discount card 710 upon satisfaction of the reward policy terms or upon authorization from the sellers 730.

While rewards may be released universally to all members of a buying group, it is to be appreciated that targeted or selective rewards may also be distributed. Targeted or selective rewards may be a function of buying patterns determined from data mining purchase data collected by the purchase data server 810. For example, a particular seller may determine that a subset of buyers in a buying group include high volume purchasers. The seller may release a special reward, discount, offer or the like to the universal discount cards 810 associated with that subset of the buying group as opposed to all members of the group. Thus, purchase data server 810 enables sellers 730 to efficiently advertise and market to buyers in a buying group by analyzing the buying history of the group.

Figure 10:
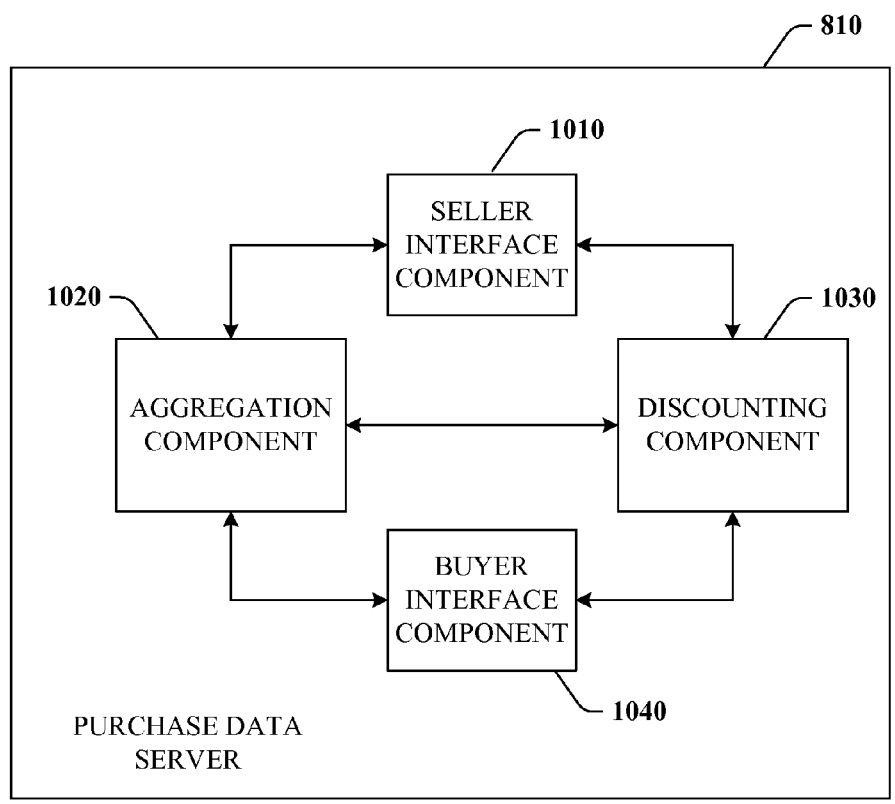
FIG. 10 is a block diagram of a representative purchase data server.

Referring now to FIG. 10, a representative purchase data server 810 is depicted. Purchase data server includes a seller interface component 1010 and a buyer interface component 1040. The seller interface component 1010 and buyer interface component 1040 enable sellers and buyers, respectively, to interact with the purchase data server 810. The interface components 1010 and 1040 may be a web site hosted by the purchase data server 810 or another server communicatively coupled to the purchase data server 810. Accordingly, the sellers and buyers may access the interface components 1010 and 1040 via a web browser on a personal computer such as Microsoft Internet Explorer®, Netscape Navigator®, Mozilla Firefox®, or the like. It is to be appreciated that the buyers and sellers may also access the buyer interface component 1040 and the seller interface component 1010, respectively, via a mobile device, such as a cellular phone or a personal digital assistant (PDA), or any device capable of interfacing with the purchase data server 810. Further, it is to be appreciated that the interface components 1010 and 1040 may include a standalone application, applet or widget executing on a personal computer, mobile device or any processor-based device. The standalone application, applet or widget may access the purchase data server 810 via a network (e.g., local area network, wide area network, Internet, wireless . . . ). Accordingly, buyers and sellers are not restricted to interfacing with the purchase data server via a web browser.

Sellers, via the seller interface component 1010, may access aggregation component 1020 and discounting component 1030. Aggregation component 1020 receives transaction information from the purchasing component 740 described with reference to FIGS. 7 and 8. The transaction information may include data pertaining to a particular transaction between a buyer and a seller such as the buyer, the seller, a purchase total, goods and/or services purchased and the like. Aggregation component 1020 records the transaction information and may store the information in a database (not shown) or other such data storage system. As part of a reward policy, sellers may create a price or discount curve. A price curve, among other things, is a function of price to quantity or amount purchased. The price curve may establish various threshold levels wherein each level is associated with a different reward, discount or offer. The aggregation component 1020 populates the price curve with information recorded from transactions between buyers and sellers. When thresholds levels on the price curve are retrieved, the universal discount card 710 may be provided with a new reward, discount, special offer or the like.

Sellers may also retrieve purchase data recorded by the aggregation component 1020. The purchase data can be data mined to determine patterns such as what goods and/or services buyers are purchasing, which buyers are spending the greatest amounts, identifying buying group subsets in accordance with specified criteria and the like. For example, sellers employing data mining techniques on the purchase data may discover a subset of the buying group particularly interested in software development books. Sellers may employ such discoveries to selectively target the subset with special advertisements, offers, rewards, discounts or the like.

The discounting component 1030 is also accessible by the sellers via the seller interface component 1010. Sellers employ the discounting component 1030 to establish a reward policy for a buying group. A reward policy may have a plurality of parameters such as purchase total thresholds, aggregation time periods (e.g. the amount of time aggregation advances the buying group's progress in meeting the threshold), rewards for meeting a threshold level and the like. The discounting component 1030 releases and distributes the rewards to the universal discount card 710 when the buying group meets one or more thresholds specified in the reward policy. The aggregation component 1020 populates a price or discount curve and this purchase aggregation triggers the discount component 1030 to determine if the terms and conditions of the reward policy are satisfied before releasing rewards to the universal discount card 710. For example, the aggregation component 1020 can record transaction between a buying group and an electronics retailer. The electronics retailer establishes a reward policy by employing the discounting component 1030 via the seller interface component 1010. The reward policy might be a $30 gift certificate for every $50,000 worth of electronics purchased by the buying group. Whenever the purchase total of transactions between the buying group and the retailer recorded and aggregated by the aggregation component 1020 reaches a multiple of $50,000, the discounting component 1030 is triggered to distribute a $30 gift certificate to the universal discount cards 710 associated with members of the buying group. Further, the electronic retailer can data mine the purchase data recorded by the aggregation component 1020 and determine, among other things, the top buyers by purchase volume in the buying group. The electronic retailer may decide to rewards the top buyers with additional rewards, discounts, special offers or the like. The electronics retailer employs the discounting component 1020 to create and distribute the additional rewards to the universal discount cards 710 associated with the top buyers.

Buyers may also employ the aggregation component 1020 and the discounting component 1030 via the buyer interface component 1040. A buyer, utilizing the aggregation component 1020, can review his individual purchases or review the aggregated purchases of the entire buying group. For example, the buyer can determine which seller received the majority of the buyer's purchases or the majority of the buying group's purchases. The buyer, utilizing the discounting component 1030, can review the reward policies established by sellers and track the buying group's progress in achieving rewards from the sellers. Buyers may also employ the discounting component to review a history of past rewards distributed and a listing of currently active rewards on the universal discount card 710. According to one aspect of the subject disclosure, the universal discount card 710 is associated with an online identity or account. The online account may be hosted by the discounting component 1030 but it should be appreciated that the online account can be hosted another system, remote or otherwise, that is communicatively coupled to the purchase data server 810. In accordance with the online account embodiment, buyers may access the online account by utilizing the discounting component 1030. Rewards, discounts, or special offers released by the discounting component 1030 are deposited in the online account to be retrieved by the buyers. The reward may be a bar code presentable to sellers to redeem the value of the reward. Buyers may print the bar code or access the bar code via a mobile device to be scanned off the mobile device display.

Buyers, upon joining the buying group, may determine a level of participation. The level of participation indicates how much transaction information is recorded by the aggregation component 1020 and, accordingly, how much information about a particular buyer sellers may access. For example, at a low level of participation, a buyer's transactions with sellers are recorded and aggregated but sellers do not have access to the buyer's identity via data mining in order to provide targeted advertisements. Conversely, at a high level of participation, sellers have access to complete buying histories of buyers and those buyers are willing to receive special offers and advertisements.

Figure 11:
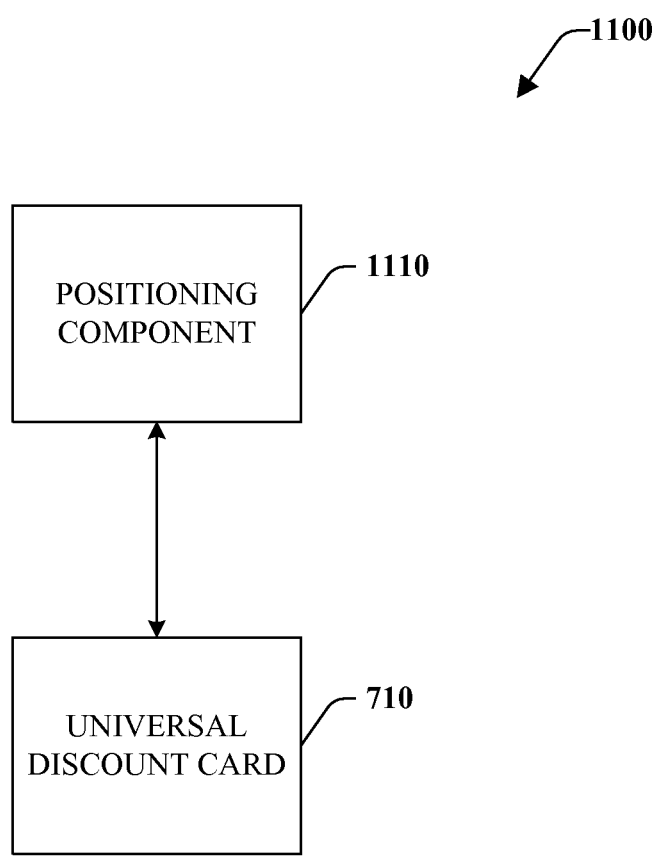
FIG. 11 is a block diagram of a universal discount card positioning system.

Turning now to FIG. 11, a targeted advertisement system 1100 is depicted including a positioning component 1110. Buyers establishing a high level of participation may be geographically monitored by the positioning component 1110. The positioning component 1110 may employ global positioning satellite (GPS) or other such locator system to determine a buyer's current location. For example, the universal discount card 710 may be GPS enabled such that sellers can discover the current whereabouts of the card 710 and, consequently, the buyer associated with the card 710. Alternatively, in accordance with another aspect of the subject disclosure, the positioning component 1110 may discern the buyer's location from a GPS mobile device (e.g., cell phone, PDA . . . ) and/or a vehicle navigation system.

Once a buyer's position is determined by locating the universal discount card 710 or some other GPS enabled device of the buyer's, sellers can provide the buyer with special offers and/or advertisements associated with those sellers nearby the buyer's current location. For example, a buyer can be at a shopping center. The buyer's position is determined by the positioning component 1110 and the buyer's universal discount card 710 may be provided with special offers and/or advertisements from sellers in the shopping center that are participating with the buyer's buying group. According to another aspect of the subject disclosure, the positioning component 1110 may ping the buyer's mobile device (e.g., cell phone, PDA, blackberry . . . ) with the special offers and/or advertisements. The buyer's mobile may receive a message containing a bar code implementing a special offer from a seller in the shopping center. The buyer may redeem the special offer by visiting the seller's location and presenting the bar code for scanning via the mobile device.

It should be appreciated that the universal discount card 710 may also be enabled with radio frequency identification (RFID). Thus, whenever the universal discount card 710 enters within a specified locality of a participating seller, its presence is detected. The seller may provide the detected universal discount card 710 with special offers and/or advertisements. While positioning component 1110 may employ a large area geographical or global location system, it should be appreciated that a smaller scale location system may also be utilized to discover potentially interested buyers.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the purchase data server 810 can utilize such techniques to facilitate analysis of purchase data of buyers in a buying group. For example, the purchase data server 810 can infer that a buyer may be interested in a particular deal as a function of previous purchases, the time of year, business and/or personal needs, among other things. Furthermore, such deals may be pushed to a user without explicit manual initiation by a seller, for instance as a notification generated as a result of location.

Figure 12:
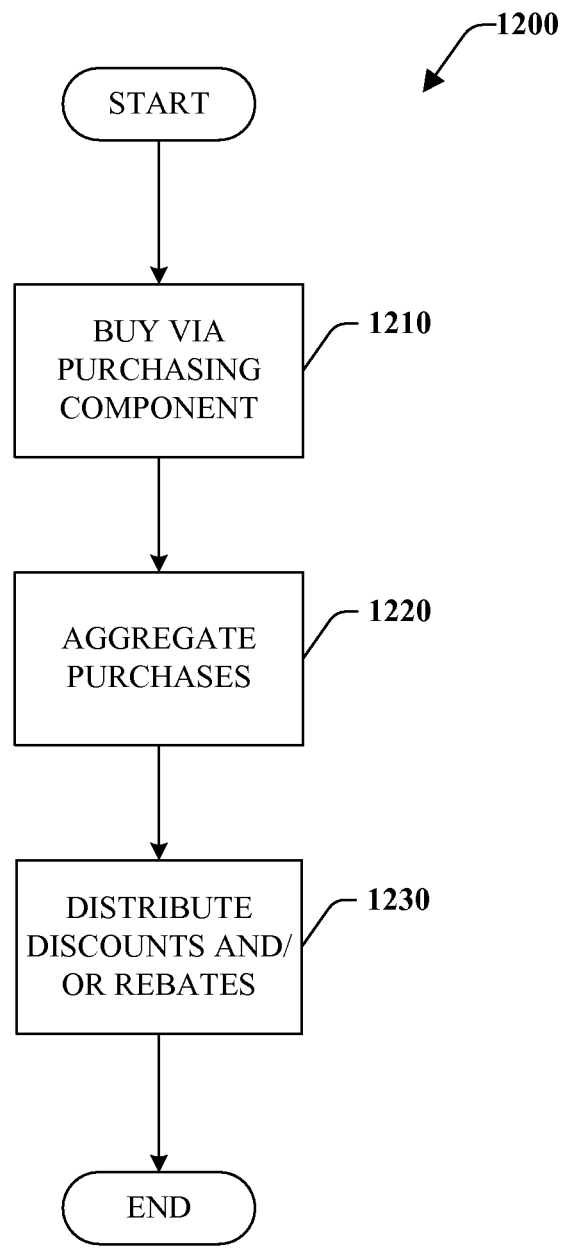
FIG. 12 is a flow chart diagram of a method of providing universal discounts.
Figure 13:
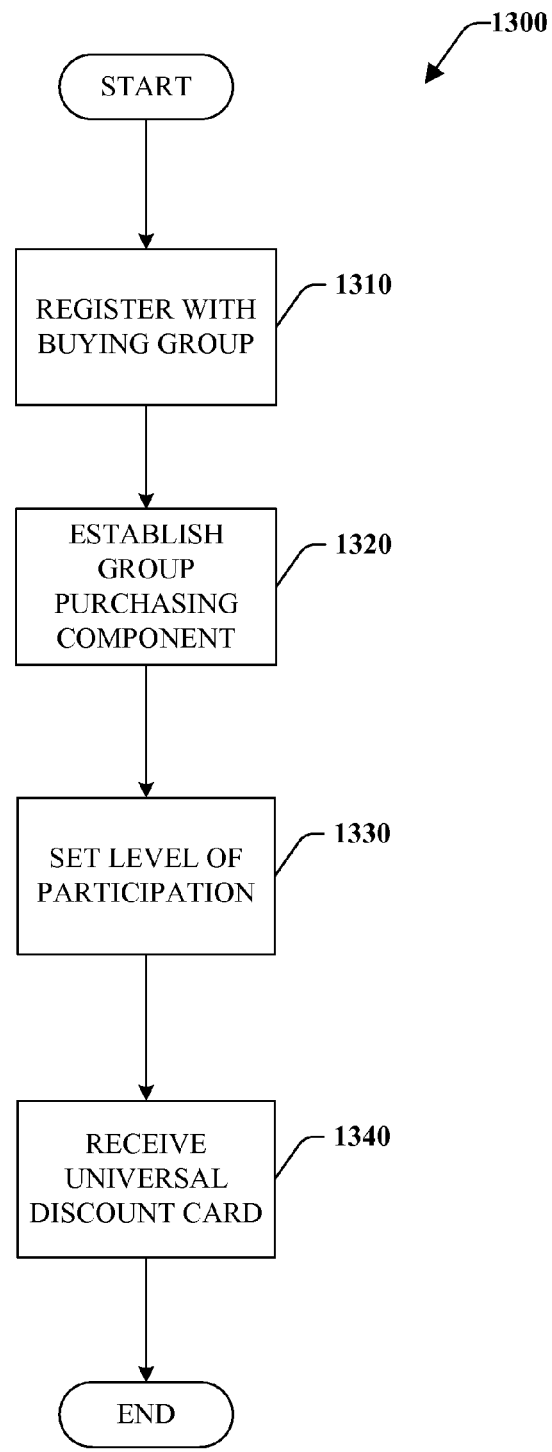
FIG. 13 is a flow chart diagram of a method of participating in demand aggregation and universal discounts.
Figure 14:
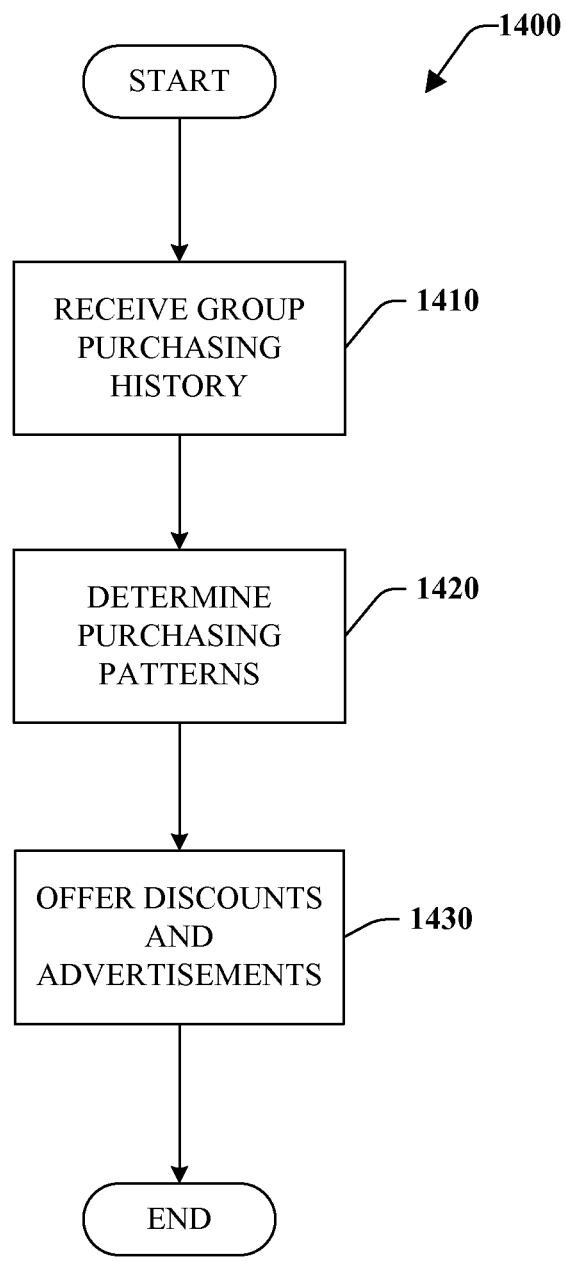
FIG. 14 is a flow chart diagram of a method of data mining buyer purchasing history data.

In view of the exemplary systems described supra, methodologies that may be implemented in accordance with the disclosed subject matter will be better appreciated with reference to the flow charts of FIGS. 12 through 14. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Referring now to FIG. 12, a method for providing universal discounts 1200 is provided. In particular, purchases by a buying group are aggregated together and the buying group receives rewards, rebates, discounts and the like as a function of the aggregation.

At reference numeral 1210, a buyer in a buying group buys goods and/or services from a seller via a purchasing component. The purchasing component can be a special credit card or a debit card issued to the buyer upon joining the buying group. It should be appreciated that the purchasing component can also be a deposit account, a personal credit or debit card, and other payment systems capable of being tracked.

At reference numeral 1220, the purchases of the buyer via the purchasing component are aggregated with the purchases of other buyers in the buying group from the seller. The seller establishes a reward policy including a price or discount curve. Under an exemplary reward policy, the buying group purchases are populated on the price or discount curve. When specified thresholds in the total purchase amount are reached, a reward may be provisioned to the buying group. It should be appreciated that other reward policies to encourage business and reward loyalty can be contemplated.

At numeral 1230, when the terms and conditions of the reward policy are satisfied, rewards, discounts, rebates and the like are distributed to the buying group via a universal discount card. The universal discount card can be a gift card, a smart card or the like. It is also to be appreciated that the universal discount card can be an online account accessible from a personal computer, mobile device (e.g. cell phone, PDA, blackberry . . . ) or other processor based device.

Turning now to FIG. 13, a method of joining a buying group 1300 is provided. At reference numeral 1310, a registration for the buying group is supplied. A buyer seeking to participate in the group buying system can register with the buying group or associated service. The buyer can fill out a registration form. The registration form can include, among other things, a username and pass code (e.g., password, random series of alphanumeric characters . . . ) associated with the buyer. The buyer utilizes the username and pass code to access group buying system to enable the buyer to review the activity of the buying group.

At reference numeral 1320, the buyer establishes a group purchasing component. The purchasing component can be a special credit or debit card issued by the buying group or associated service. Alternatively, the buyer can register a personal credit or debit card as the purchasing component.

At numeral 1330, the buyer establishes the desired level of participation. At a low participation level, the buyer's purchases are aggregated with those of the buying group. However, the seller may not access all the transaction details of the buyer's purchasing history. Further, the buyer's low level of participation indicates the buyer's desire to not receive targeted or selective advertisements and/or offers. Conversely, at a high participation level, the buyer's purchases are still aggregated, but sellers may access complete details of the buyer's purchasing history. The buyer also indicates a desire to receive specially targeted advertisements and/or offers. Further, a high level of participation may also indicate a willingness to be globally or geographically positioned in order to receive special advertisements and deals in a geographical context. Moreover, there can be a number of levels between high and low that include various combinations of services and/or functionality.

At reference numeral 1340, a universal discount card is issued to the buyer. The universal discount card can be a gift card, a smart card or the like. The universal discount card can also be an online account or program accessible via a network (e.g., local area network, wide area network, Internet, wireless, satellite . . . ). It should also be appreciated that the universal discount card can be the same as the special credit card issued at reference numeral 1320. In that respect, the rewards can be a cash-back refund or the like.

Referring now to FIG. 14, a method for targeted advertising 1400 is provided. At reference numeral 1410, purchasing history of a buying group is received. The purchasing history includes information such as the buyer, the seller, the goods and/or services purchased and the like. At numeral 1420, purchasing patterns are determined Data mining and/or artificial intelligence techniques are employed on the purchasing history to discover patterns. For example, the goods and/or services of particular interest to the buying group can be determined. Also, discreet subsets of the buying groups can be discerned. The linking characteristics of buyers in a subset can include type of goods and/or service purchased, geographical location, purchase volume and the like. For example, a subset can be discerned wherein the subset comprises buyers within a particular city buying the largest volumes of video games. At numeral 1430, special discount and/or advertisements can be offered based upon the patterns discovered at numeral 1420. For example, the subset of video game enthusiasts can receive special offers and advertisements from video game retailers. Thus, sellers can send direct advertisements and, thus, achieve greater results that what would be gained from blanket, indiscriminate advertising.

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 15:
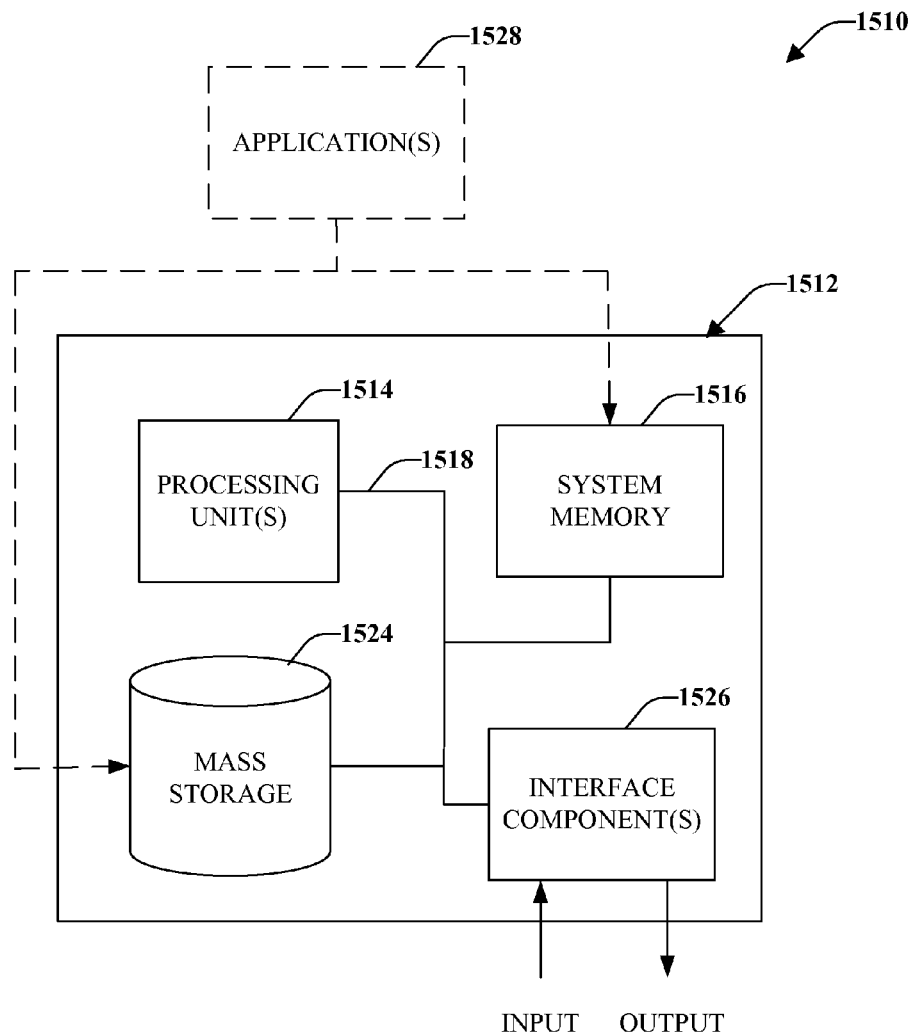
FIG. 15 is a schematic block diagram illustrating a suitable operating environment for aspects of the subject innovation.
Figure 16:
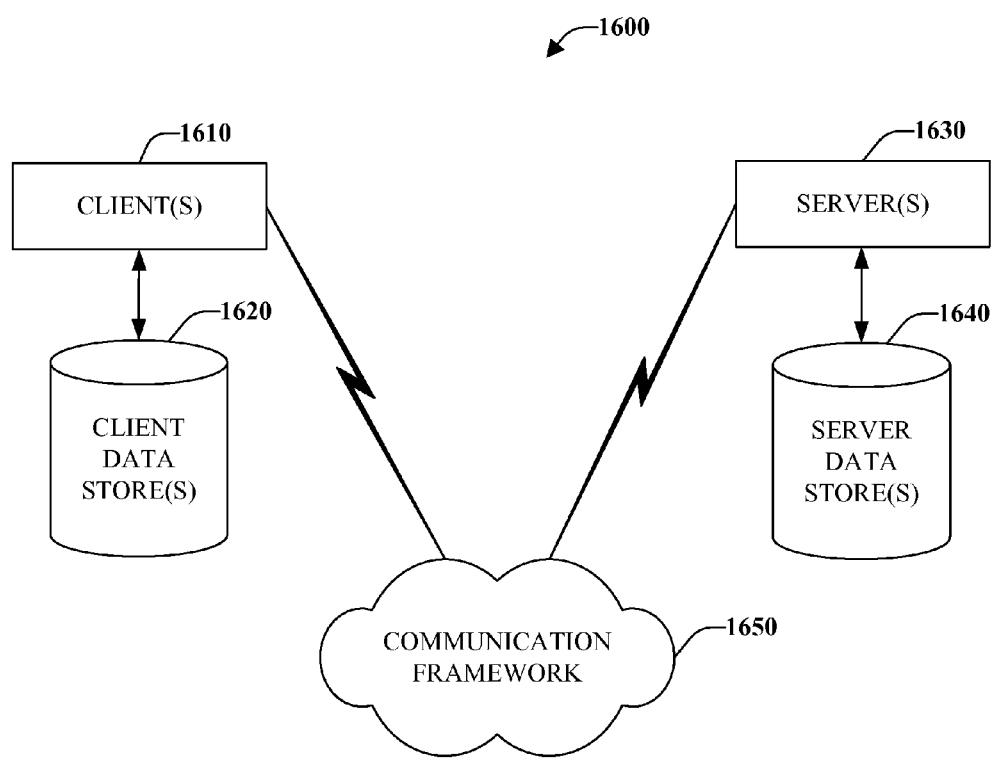
FIG. 16 is a schematic block diagram of a sample-computing environment.

In order to provide a context for the various aspects of the disclosed subject matter, FIGS. 15 and 16 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 15, an exemplary environment 1510 for implementing various aspects disclosed herein includes a computer 1512 (e.g., desktop, laptop, server, hand held, programmable consumer or industrial electronics . . . ). The computer 1512 includes a processing unit 1514, a system memory 1516 and a system bus 1518. The system bus 1518 couples system components including, but not limited to, the system memory 1516 to the processing unit 1514. The processing unit 1514 can be any of various available microprocessors. It is to be appreciated that dual microprocessors, multi-core and other multiprocessor architectures can be employed as the processing unit 1514.

The system memory 1516 includes volatile and nonvolatile memory. The basic input/output system (BIOS), containing the basic routines to transfer information between elements within the computer 1512, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1512 also includes removable/non-removable, volatile/non-volatile computer storage media. FIG. 15 illustrates, for example, mass storage 1524. Mass storage 1524 includes, but is not limited to, devices like a magnetic or optical disk drive, floppy disk drive, flash memory or memory stick. In addition, mass storage 1524 can include storage media separately or in combination with other storage media.

FIG. 15 provides software application(s) 1528 that act as an intermediary between users and/or other computers and the basic computer resources described in suitable operating environment 1510. Such software application(s) 1528 include one or both of system and application software. System software can include an operating system, which can be stored on mass storage 1524, that acts to control and allocate resources of the computer system 1512. Application software takes advantage of the management of resources by system software through program modules and data stored on either or both of system memory 1516 and mass storage 1524.

The computer 1512 also includes one or more interface components 1526 that are communicatively coupled to the bus 1518 and facilitate interaction with the computer 1512. By way of example, the interface component 1526 can be a port (e.g., serial, parallel, PCMCIA, USB, FireWire . . . ) or an interface card (e.g., sound, video, network . . . ) or the like. The interface component 1526 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1512 to output device(s) via interface component 1526. Output devices can include displays (e.g., CRT, LCD, plasma . . . ), speakers, printers and other computers, among other things.

FIG. 16 is a schematic block diagram of a sample-computing environment 1600 with which the subject innovation can interact. The system 1600 includes one or more client(s) 1610. The client(s) 1610 can be hardware and/or software (e.g., threads, processes, computing devices). The system 1600 also includes one or more server(s) 1630. Thus, system 1600 can correspond to a two-tier client server model or a multi-tier model (e.g., client, middle tier server, data server), amongst other models. The server(s) 1630 can also be hardware and/or software (e.g., threads, processes, computing devices). The servers 1630 can house threads to perform transformations by employing the aspects of the subject innovation, for example. One possible communication between a client 1610 and a server 1630 may be in the form of a data packet transmitted between two or more computer processes.

The system 1600 includes a communication framework 1650 that can be employed to facilitate communications between the client(s) 1610 and the server(s) 1630. Here, the client(s) can correspond to user (e.g. buyers or sellers) computing devices and the server(s) can provide the functionality of the purchase data server, as previously described. The client(s) 1610 are operatively connected to one or more client data store(s) 1660 that can be employed to store information local to the client(s) 1610. Similarly, the server(s) 1630 are operatively connected to one or more server data store(s) 1640 that can be employed to store information local to the servers 1630. By way of example, a user (e.g., buyer and/or seller) can login to one or more servers 1630 via a client 1610 and provide a profile including information about the user corresponding to the user's identity. The server(s) 1630 can persist this information to data store(s) 1640.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A mobile device, comprising:
  a non-transitory computer readable storage medium having embodied thereon instructions executable by a processor to:
    prompt a user to accept terms and conditions on the mobile device as a requirement to activate a service with at least one service provider, wherein the terms and conditions provide notice to the user regarding:
      how information collected by way of the mobile device will be used,
      how the information collected by way of the mobile device will be protected, and
      the fact that collection of at least some of the information by way of the mobile device cannot be blocked by the user,
    generate purchasing data associated with the user that includes information about products or services purchased by way of a credit or debit card;
  a location-based service module executable to generate location-based data, wherein the location-based data corresponds to activities associated with the user of the mobile device; and
  a wireless transmitter that:
    transmits the location-based data to a third party, automatically transmits at least a subset of the purchasing data, and receives an offer for the product or service in response to the transmission of the subset of purchasing data and in accordance with a search function that allows the user to input location and delivery time criteria associated with the product or service.

2. The mobile device of claim 1, wherein the instructions executable by the processor allow for purchase of the product or service in conjunction with a sponsored credit or debit card selected as a default payment method.

3. The mobile device of claim 2, wherein the accumulated purchasing data includes purchases on the sponsored credit or debit card.

4. The mobile device of claim 1, wherein the offer for the product or service of a particular seller includes a discount that is calculated according to a purchase amount achieved during a particular time period by a single buyer from the particular seller.

5. The mobile device of claim 1, wherein the offer for the product or service is redeemed at a point-of-sale (POS) of one or more sellers.

6. The mobile device of claim 1, wherein the location-based service module operates in conjunction with a global positioning system and determines a current position of a buyer relative to one or more sellers.

7. The mobile device of claim 6, wherein the received offer is based upon the current position of the mobile device as determined by the global positioning system and location-based service module.

8. The mobile device of claim 1, wherein the subset of purchasing data is transmitted to a central server.

9. The mobile device of claim 1, wherein the subset of purchasing data is transmitted to one or more sellers.

10. The mobile device of claim 1, further comprising a display that presents a representation of the offer.

11. The mobile device of claim 10, wherein the representation of the offer includes a machine readable code that identifies the offer.

12. The mobile device of claim 10, wherein the representation of the offer includes a machine readable code that identifies the product or service.

13. The mobile device of claim 10, wherein the representation of the offer includes a human readable product description associated with the product or service.

14. The mobile device of claim 10, wherein the representation of the offer includes a human readable product description associated with the offer.

15. The mobile device of claim 1, wherein the user has selected a default shipping method or preference for delivery of products.

16. The mobile device of claim 1, wherein tracking location-based activities includes determining that the location of the mobile device is within proximity of a visual communication device.

17. The mobile device of claim 16, wherein the offer is presented to the mobile device by way of the visual communication device, the visual communication device including a visual advertisement.

18. The mobile device of claim 16, wherein the visual communication device is a television screen.

19. The mobile device of claim 16, wherein the information collected by way of the mobile device includes whether a search was performed by the user.

20. The mobile device of claim 16, wherein the collected information includes an indication that a purchase was made by the user.

* * * * *